United States Patent
Funada

(10) Patent No.: US 6,732,016 B2
(45) Date of Patent: *May 4, 2004

(54) ROBOT, IDENTIFYING ENVIRONMENT DETERMINING METHOD, AND PROGRAM THEREOF

(75) Inventor: Junichi Funada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/308,155

(22) Filed: Dec. 3, 2002

(65) Prior Publication Data

US 2003/0083785 A1 May 1, 2003

Related U.S. Application Data

(62) Division of application No. 10/057,947, filed on Jan. 29, 2002, now Pat. No. 6,516,247.

(30) Foreign Application Priority Data

Jan. 30, 2001 (JP) .................................... 2001/021648
Jan. 25, 2002 (JP) .................................... 2002/017642

(51) Int. Cl.[7] .............................................. G06F 19/00

(52) U.S. Cl. .................... 700/245; 700/56; 700/258; 318/567; 318/568.11; 318/568.12; 318/568.16; 701/23; 250/332; 250/334

(58) Field of Search .................... 700/245, 56, 258; 318/567, 568.11, 568.12, 568.16; 701/23; 901/1; 396/128, 429; 250/334, 332

(56) References Cited

U.S. PATENT DOCUMENTS

| 5,614,714 A | * | 3/1997 | Shaffer ........................ 250/334 |
| 5,614,715 A | * | 3/1997 | Jones et al. ................. 250/334 |
| 5,663,562 A | * | 9/1997 | Jones et al. ................. 250/332 |
| 5,781,650 A | * | 7/1998 | Lobo et al. .................. 382/118 |
| 6,301,440 B1 | * | 10/2001 | Bolle et al. ................. 396/128 |
| 6,516,247 B2 | * | 2/2003 | Funada ........................ 700/245 |
| 2001/0020837 A1 | * | 9/2001 | Yamashita et al. .......... 318/567 |

FOREIGN PATENT DOCUMENTS

| JP | 11-316836 | 11/1999 |
| JP | 2000-222576 | 8/2000 |

OTHER PUBLICATIONS

Mizoguchi et al., Human–robot collaboration in the smart office environment, 1999, IEEE, pp. 79–84.*
Kuno et al., Behavior–based mobile robot using active sensor fusion, 1992, IEEE, pp. 1675–1682.*

(List continued on next page.)

Primary Examiner—William A. Cuchlinksi, Jr.
Assistant Examiner—McDieunel Marc
(74) Attorney, Agent, or Firm—McGinn & Gibb, PLLC

(57) ABSTRACT

An identification environment determining method includes converting a captured image into digital information, detecting a face area of a person from the digital image to store the face area, and identifying the person using a stored image and face image information that is referred for identification, informing a user about a result of identification acquired, inputting information obtained by having the user judge whether the result of identification is correct or incorrect, determining whether a present lighting environment is suitable for identification, controlling a robot, and moving the robot.

44 Claims, 20 Drawing Sheets

OTHER PUBLICATIONS

Kuno, et al., "Behavior–Based Mobile Robot Using Active Sensor Fusion", 1992, IEEE, pp. 1675–1682.

Makoto Kosugi, "Human–Face Search and Location in a Scene by Multi–Pyramid Architecture for Personal Identification", Institute of Electronics, Information, and Communication Engineers, vol. J77–D–11, No. 4, pp. 672–681, Apr. 1994.

Matthew A. Turk and Alex P. Pentland, "Face Recognition Using Eigenfaces", Vision and Modeling Group, The Media Laboratory Massachusetts Institute of Technology, Proceedings of IEEE, CVPR91, pp. 586–591.

U.S. patent application Publication No. 2001/002837.

Mizoguchi, et al., "Human–Robot Collaboration in the Smart Office Environment", 1999, IEEE, pp. 79–84.

* cited by examiner

LIGHTING ENVIRONMENT CATEGORY

| TIME ID | TIME |
|---------|------|
| T 1 | 6:00~9:59 |
| T 2 | 10:00~13:59 |
| T 3 | 14:00~17:59 |
| T 4 | 18:00~5:59 |

| CEILING LIGHT ID | CEILING LIGHT |
|------------------|---------------|
| L 1 | ON |
| L 2 | OFF |

| FACE AREA CONTRAST ID | FACE AREA CONTRAST |
|-----------------------|--------------------|
| F 1 | 0~19 |
| F 2 | 20~39 |
| F 3 | 40~59 |
| F 4 | 60~79 |
| F 5 | 80~ |

NAMES OF CATEGORIES ARE AS FOLLOWS ; "TIME ID" , "CEILING ID" , AND "FACE AREA CONTRAST ID".

EXAMPLE : WHEN TIME IS 6:00~9:59, CEILING LIGHT IS OFF, AND FACE AREA CONTRAST IS 60~79
→ CLASSIFIED INTO CATEGORY T1, L2, AND F4

FIG. 6

| LIGHTING CONDITION CATEGORY | IDENTIFYING PERFORMANCE INFORMATION |
|:---:|:---:|
| T1L1F1 | r=4   t=12 |
| T1L1F2 | r=17  t=18 |
| T1L1F3 | r=6   t=8 |
| T1L1F4 | r=10  t=27 |
| T1L2F1 | r=1   t=4 |
| T1L2F2 | r=1   t=2 |
| T1L2F3 | r=17  t=17 |
| T1L2F4 | r=21  t=23 |
| T2L1F1 | r=10  t=25 |
| T2L1F2 | r=4   t=19 | r : NUMBER OF TIMES WHERE IDENTIFICATION HAS BEEN SUCCESSFUL IN PAST
t : NUMBER OF TIMES WHERE IDENTIFICATION HAS BEEN EXECUTED IN PAST

FIG. 11

| M5 | M10 | M15 |
|----|-----|-----|
| M4 | M9  | M14 |
| M3 | M8  | M13 |
| M2 | M7  | M12 |
| M1 | M6  | M11 |

FIG. 12

| POSITION | LIGHTING CONDITION CATEGORY | IDENTIFYING PERFORMANCE INFORMATION | POSITION | LIGHTING CONDITION CATEGORY | IDENTIFYING PERFORMANCE INFORMATION | ... |
|---|---|---|---|---|---|---|
| M1 | T1L1F1<br>T1L1F2<br>T1L1F3<br>... | r=3  t=10<br>r=11 t=13<br>r=3  t=5<br>... | M2 | T1L1F1<br>T1L1F2<br>T1L1F3<br>... | r=4  t=12<br>r=17 t=18<br>r=6  t=8<br>... | ... |

ROBOT, IDENTIFYING ENVIRONMENT DETERMINING METHOD, AND PROGRAM THEREOF

The present Application is a Divisional Application of U.S. patent application Ser. No. 10/057,947 filed on Jan. 29, 2002 now U.S. Pat. No. 6,516,247

BACKGROUND OF THE INVENTION

The present invention relates to a robot which is used in house and has a function to store an image(s) of a user's face and identify a person by using image information, an identifying environment determining method, and a program thereof.

DESCRIPTION OF THE RELATED ART

In recent years, a robot typified by a pet-type robot has been developed for entertainment, which is configured so as to pick tip and register a face image of its owner, identify a person by using the picked up image, and call his/her name, and so forth.

FIG. 1 is a diagram showing an example of a configuration of a conventional robot having a face identifying function. The robot comprises an imaging means 1, a face detecting and identifying means 2, an information informing means 3, an information inputting means 4, a controlling means 7, a moving means 8 or the like. The imaging means 1 picks up video. The face detecting and identifying means 2 detects, from an image obtained at the imaging means 1, a face area of a person and stores it, and identifies a person with a newly obtained image using stored face image information. The information informing means 3 informs a user about result of identification obtained at the face detecting and identifying means 2. The information inputting means 4 is disposed so that a user can input whether result of identification informed to the user by the information informing means 3 is correct or incorrect. The controlling means 7 is disposed for controlling the whole robot. The moving means 8 is disposed so that the robot itself can move. The robot communicates with a user, on the basis of commands from the controlling means 7, through the information inputting means 4 and the information informing means 3. Further, the robot moves in a room using the moving means 8. Subsequently, the robot recognizes a user's face using the imaging means 1 and the face detecting and identifying means 2, and determines who is the user dialoguing with the robot face-to-face.

In the case of face identification using a robot for domestic use, a lighting environment in a house is of a problem. In a house, it is often the case that a room is equipped with one light and that a house is designed so as to let in much sunshine. Therefore, the amount of lighting changes drastically according to places and time zones. Moreover, compared to offices where lighting is designed for fine work, lighting in a house is relatively dark. Therefore, there may exist an environment not suitable for identification significantly. In a conventional identifying system, it is difficult to absorb variations of amounts of characteristics caused by the variations of lighting under such conditions. This leads to deterioration of accuracy of identifying performance. Furthermore, when a face area is not illuminated sufficiently, it is difficult to extract characteristics required for identification, which leads to failuer of identification.

To execute face identification under such conditions, there is disclosed a technique in Japanese Patent Application Laid-Open No. 2000-222576. The technique is intended to absorb the variations of lighting by storing, as dictionary data, an amount of characteristics extracted from a plurality of images, per person, each in which the way to illuminate the person is different, and executing linear discrimination using the data.

However, even by this method, it is difficult to absorb the variations between a face image obtained at registration and that obtained under such condition that the lighting state is remarkably different from that at the registration, which leads to incorrect identification.

SUMMARY OF THE INVENTION

It is therefore an object of the present invention to provide a robot, an identifying environment determining method, and a program thereof, wherein it is possible to reduce incorrect identification (matching) in the case of executing face identification in a place where variations of lighting are large such as in a house and in a place where a lighting environment is significantly bad for identification.

According to a first aspect of the present invention, for achieving the objects mentioned above, there is provided a robot comprising:

an imaging means for picking up an image and digitizing the image;

a face detecting and identifying means for detecting, from an image acquired at the imaging means, a face area of a person and storing the face area, and identifying a person using a stored image and face image information that is referred for identification;

an information informing means for informing a user about result of identification acquired at the face detecting and identifying means;

an information inputting means disposed so that a user can input information whether result of identification informed to the user by the information informing means is correct or incorrect;

an identification result reliability calculating means for determining, using information from the imaging means, whether or not a present lighting state is suitable for identification;

a controlling means for controlling a robot; and a moving means for moving a robot.

According to a second aspect of the present invention, in the first aspect, the identification result reliability calculating means determines a lighting environment using a variance value of pixel values in a face area detected at the face detecting and identifying means.

According to a third aspect of the present invention, in the first aspect, the identification result reliability calculating means determines a lighting environment using a ratio of an average pixel value in a face area detected at the face detecting and identifying means to that in the vicinity of an outside of the face area.

According to a fourth aspect of the present invention, in the first aspect, the identification result reliability calculating means determines a lighting environment using an average pixel value of whole image.

According to a fifth aspect of the present invention, in the first aspect, the robot further comprises a robot state observing means observing a lighting state in a room using a lighting device state observing means working with a lighting device in a room to detect whether or not the lighting device is turned on, wherein the identification result reliability calculating means determines a lighting environment using information whether or not the lighting device is turned on.

According to a sixth aspect of the present invention, in the first aspect, the robot further comprises
a robot state observing means observing a curtain state in a room using a curtain state observing means working with curtains to detect whether or not the curtains are drawn, wherein
the identification result reliability calculating means determines a lighting environment using information whether or not the curtains are drawn.

According to a seventh aspect of the present invention, in the first aspect, the robot further comprises
a robot state observing means retaining information about time, wherein
the identification result reliability calculating means determines a lighting environment using information about time before executing identification.

According to an eighth aspect of the present invention, in the first aspect, the robot further comprises
a robot state observing means retaining positional information acquired by observing a position of a robot in a room, wherein
the identification result reliability calculating means determines a lighting environment using the positional information.

According to a ninth aspect of the present invention, there is provided a robot comprising:
an imaging means for picking up an image and digitizing the image;
a face detecting and identifying means for detecting, from all image acquired at the imaging means, a face area of a person and storing the face area, and identifying a person using a stored image and face image information that is referred for identification;
an information informing means for informing a user about result of identification acquired at the face detecting and identifying means;
an information inputting means disposed so that a user call input information whether result of identification informed to the user by the information informing means is correct or incorrect;
a lighting environment determining means for determining a lighting environment on the basis of image information acquired from the imaging means, and determining which predetermined lighting category corresponds to the lighting environment;
an identifying performance recording means for recording, as identifying performance information, a classification of a lighting category at face identification, the category being determined at the lighting environment determining means, number of times where face identification has succeeded per lighting category, and number of times where face identification has been executed per lighting category;
a lighting environment comparing means for determining, on the basis of the identifying performance information recorded in the identifying performance recording means, whether or not a present lighting environment is suitable for identification;
a controlling means for controlling a robot; and
a moving means for moving a robot.

According to a tenth aspect of the present invention, there is provided a robot comprising:
an imaging means for picking tip an image and digitizing the image;
a face detecting and identifying means for detecting, from an image acquired at the imaging means, a face area of a person and storing the face area, and identifying a person using a stored image and face image information that is referred for identification;
an information informing means for informing a user about result of identification acquired at the face detecting and identifying means;
an information inputting means disposed so that a user call input information whether result of identification informed to the user by the information informing means is correct or incorrect;
a lighting environment determining means for determining a lighting environment on the basis of image information acquired from the imaging means, and determining which predetermined lighting category corresponds to the lighting environment;
an identifying performance recording means for recording, as identifying performance information, a classification of a lighting category at face identification, the category being determined at the lighting environment determining means, number of times where face identification has succeeded per lighting category, and number of times where face identification has been executed per lighting category;
a lighting environment comparing means for determining, on the basis of the identifying performance information recorded in the identifying performance recording means, whether or not a present lighting environment is suitable for identification;
a controlling means for controlling a robot;
a moving means for moving a robot; and
a moving plan making means for making a moving plan, on the basis of information recorded in the identifying performance recording means, to move a robot to a position where identifying performance is higher.

According to an eleventh aspect of the present invention, there is provided a robot comprising:
all imaging means for picking up an image and digitizing the image;
a face detecting and identifying means for detecting, from an image acquired at the imaging means, a face area of a person and storing the face area, and identifying a person using a stored image and face image information that is referred for identification;
an information informing means for informing a user about result of identification acquired at the face detecting and identifying means;
an information inputting means disposed so that a user call input information whether result of identification informed to the user by the information informing means is correct or incorrect;
a lighting environment determining means for determining a present lighting environment on the basis of image information acquired from the imaging means, determining which predetermined lighting category corresponds to the lighting environment, and classifying the lighting environment of a face image stored in the face detecting and identifying means into a lighting category;
a lighting environment at registration recording means for recording, per user, the lighting category of the stored face image;

a lighting environment at registration comparing means for determining, on the basis of information recorded in the lighting environment at registration recording means, whether or not a face image of a user communicating with a robot has been registered in a same lighting environment as a present lighting environment;

a controlling means for controlling a robot; and a moving means for moving a robot.

According to a twelfth aspect of the present invention, there is provided a robot comprising:

an imaging means for picking up an image and digitizing the image;

a face detecting and identifying means for detecting, from an image required at the imaging means, a face area of a person and storing the face area, and identifying a person using a stored image and face image information that is referred for identification;

an information informing means for informing a user about result of identification acquired at the face detecting and identifying means;

an information inputting means disposed so that a user can input information whether result of identification informed to the user by the information informing means is correct or incorrect;

a lighting environment determining means for determining a lighting environment on the basis of image information acquired from the imaging means, and determining which predetermined lighting category corresponds to the lighting environment;

a face detecting means for detecting, from an image acquired at the imaging means, a face area to extract the face area, and converting the face area into data to execute identification;

a data controlling means for storing a characteristic data group of a face per person at acquisition thereof in each lighting category acquired at the lighting environment determining means;

a dictionary compiling means for compiling a recognition dictionary using characteristic data per lighting category;

a dictionary storing means for storing, per lighting category, a recognition dictionary compiled at the dictionary compiling means;

a dictionary selecting means for selecting, from the dictionary storing means, a recognition dictionary of a same lighting category is that determined at the lighting environment determining means, and supplying the dictionary to a face identifying means;

a face identifying means for executing identification of characteristic data supplied from the face detecting means to determine a user's name on the basis of a recognition dictionary supplied from the dictionary selecting means;

a controlling means for controlling a robot; and a moving means for moving a robot.

According to a thirteenth aspect of the present invention, in one of the aspects 9 to 12, the lighting environment determining means categorizes a lighting environment using a variance value of pixel values in a face area detected at the face detecting and identifying means.

According to a fourteenth aspect of the present invention, in one of the aspects 9 to 12, the lighting environment determining means categorizes a lighting environment using a ratio of an average pixel value in a face area detected at the face detecting and identifying means to that in the vicinity of an outside of the face area.

According to a fifteenth aspect of the present invention, in one of the aspects 9 to 12, the lighting environment determining means categorizes a lighting environment using an average pixel value of whole image.

According to a sixteenth aspect of the present invention, in one of the aspects 9 to 12, the robot further comprises a robot state observing means observing a lighting state in a room using a lighting device state observing means working with a lighting device in a room to detect whether or not the lighting device is turned on, wherein the lighting environment determining means categorizes a lighting environment using information whether or not the lighting device is turned on.

According to a seventeenth aspect of the present invention, in one of the aspects 9 to 12, the robot further comprises a robot state observing means observing a curtain state in a room using a curtain state observing means working with curtains to detect whether or not the curtains are drawn, wherein the lighting environment determining means categorizes a lighting environment, using information whether or not the curtains are drawn.

According to an eighteenth aspect of the present invention, in one of the aspects 9 to 12, the robot further comprises a robot state observing means retaining information about time, wherein the lighting environment determining means categorizes a lighting environment using information about time before executing identification.

According to a nineteenth aspect of the present invention, in one of the aspects 9 to 12, the robot further comprises a robot state observing means retaining positional information acquired by observing a position of a robot in a room, wherein the lighting environment determining means categorizes a lighting environment using the positional information.

Furthermore, the present invention includes an identifying and determining method for determining a lighting environment and a program for executing the method by using the robot.

BRIEF DESCRIPTION OF THE DRAWINGS

The object and features of the present invention will become more apparent from the consideration of the following detailed description taken in conjunction with the accompanying drawings in which:

FIG. 6 is a diagram showing a method for writing down record of identification result with respect to each lighting environment at an identifying performance recording means according to the second embodiment of the present invention;

FIG. 11 is a diagram for explaining a method of dividing a room into several areas and assigning an ID per area for control;

FIG. 12 is a diagram showing a method for categorizing a lighting environment at a lighting environment determining means according to the fourth embodiment;

DESCRIPTION OF THE PREFERRED EMBODIMENTS

Figure 1:
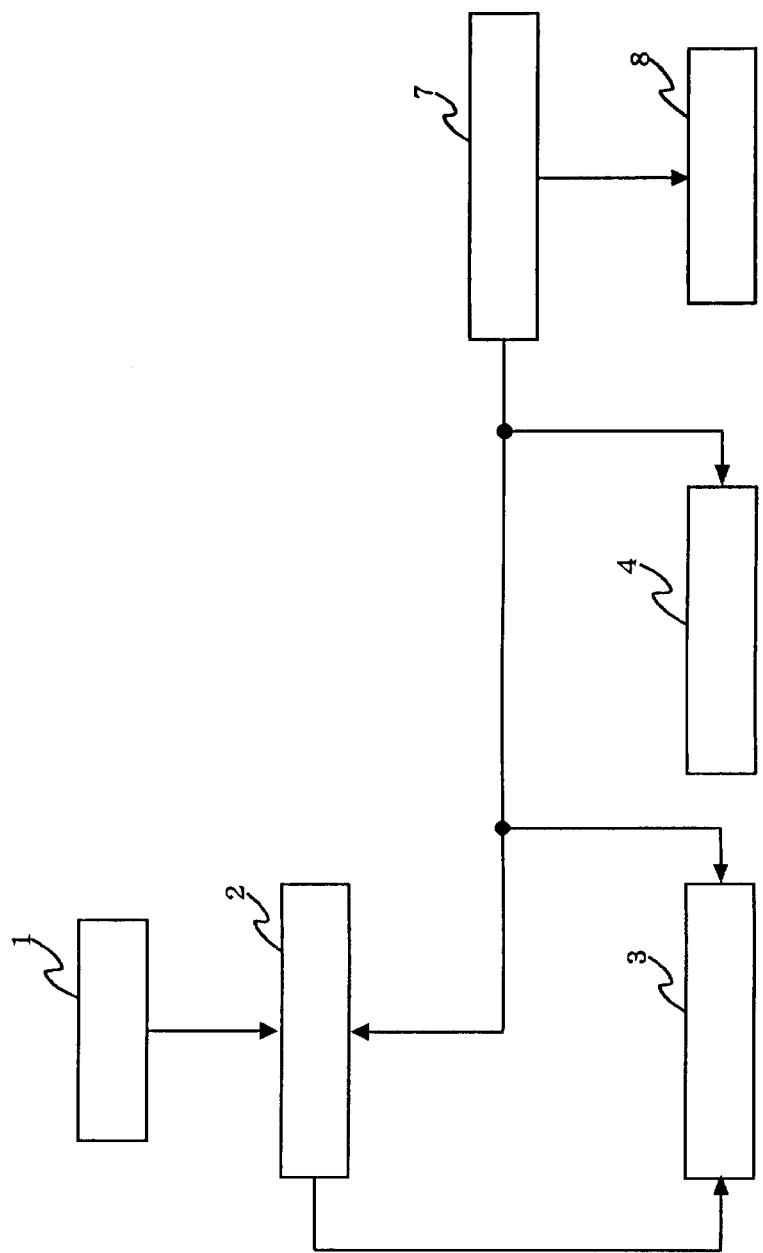
FIG. 1 is a block diagram showing a configuration of a conventional robot having a face identifying function.

Referring now to the drawings, embodiments of the present invention are explained in detail. In reference to FIGS. 2 to 20, there are shown embodiments of the present invention.

[First Embodiment]

Figure 2:
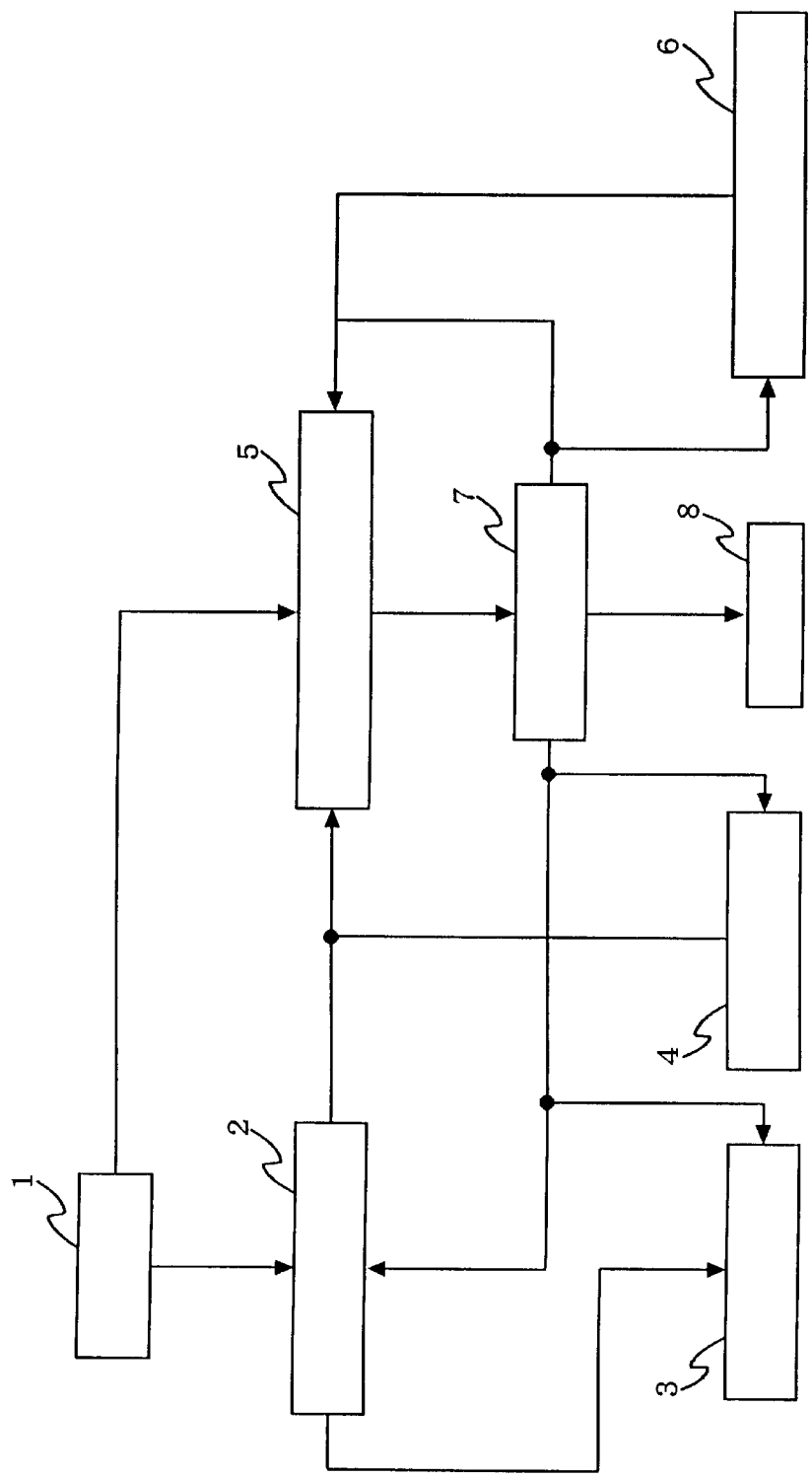
FIG. 2 is a block diagram showing a configuration of a embodiment of the present invention.

Referring to FIG. 2, a robot according to a first embodiment of the present invention comprises an imaging means 1, a face detecting and identifying means 2, an information informing means 3, an information inputting means 4, an identification result reliability calculating means 5, a robot state observing means 6, a controlling means 7, and a moving means 8. The imaging means 1 includes, for example, a charge-coupled device (CCD) camera, or an analog imaging means and an analog-digital (A/D) converter, etc. for picking up an image and digitizing it. The face detecting and identifying means 2 detects, from image information obtained at the imaging means 1, a face area of a person to store it. In addition, after a controlling means 7 determines to shift to a state of face identification, the face detecting and identifying means 2 identifies (or executes matching of) a person in a newly obtained image by using stored face image information. The information informing means 3 informs a user about result of identification obtained at the face detecting and identifying means 2 by announcing the result by voice, displaying it on a display, for example, a cathode ray tube (CRT), or the like. The information inputting means 4 is disposed so that a user can input, by voice, a button(s) and/or a switch(es) or the like, whether the results of identification informed to the user by the information informing means 3 is correct or incorrect. The identification result reliability calculating means 5 determines whether or not a lighting state at present is suitable for face identification. The robot state observing means 6 retains information about a position of the robot, time and so forth. The controlling means 7 controls the robot: for example, when the identification result reliability calculating means 5 determines that a lighting environment is not suitable for identification, the controlling means 7 controls the operation so as not to shift to a state of identifying a face. The moving means 8 has, for example, wheels and a motor disposed so that the robot itself call move.

The face detecting and identifying means 2 detects, from an image picked tip at the imaging means 1, a face of a person to register it. Subsequently, after the controlling means 7 determines to shift to a state of identification, the face detecting and identifying means 2 identifies (or executes matching of) a person reflected in a newly obtained image using stored face image information. An explanation will be given of an example of a method of detecting a face image of a person from an obtained image, which is disclosed in Japanese Patent Application Laid-Open No. 2000-222576. First, a group of pixels undergoing motion in the image frame is detected. Specifically, the difference between the present input image data frame and the immediately preceding image data frame is taken, and differential image g is generated. Also, there is added together and taken an average of differential images for past m (m being 2 or a greater integer) differential images g, thus obtaining average differential image G. The average differential image G is such that an area without motion has a pixel value of zero and that an area with a more motion has a greater pixel value. The average differential image G contains much noise like sesame and salt, and thereby, a noise removing process is executed. Examples of the noise removing process are an expanding and contracting process and a median filter process. Next, head rectangular data is obtained from the average differential image G. First, the width of the area with motion is obtained for each scan line. The width of the area with motion represents the difference between the maximum and minimum x-data in the area with motion. Subsequently, the Y-coordinate of the head top is obtained. In a method of obtaining the head top data, the minimum Y-coordinate of the area with motion is determined to be the head top. Then, the Y-coordinate of the bottom of the head rectangle is obtained. In a method of obtaining the bottom data of the head rectangle, the image is retrieved downward (Y-direction) from the head top to obtain a line, in which the width of the area with motion is less than the average width dm thereof, and the maximum Y-coordinate in that line is determined to be the bottom of the head rectangle. Subsequently, the left and right, X-data of the head rectangle (rectangularly cutted head part) is obtained. As a method of obtaining the left and right X-data, there is obtained coordinates of the left and right ends of the area with motion in the line thereof, which has the maximum width of the area with motion in a range from the head top to the head lower part. Subsequently, a suitable size rectangle is extracted from the head rectangle thus obtained as shifting to a next pixel one by one in the head rectangle to evaluate face similarity. Then, a position indicating best face similarity is detected as a face. To evaluate face similarity, first, a face image is correctly and artificially extracted from numerous images of various persons, the images being prepared and arranged in advance. Then, there is obtained a subspace spanned by a lower eigenvector(s) by executing principal component analysis to the extracted face image data. Thereafter, the face similarity is determined by examining whether or not the distance between the subspace spanned by the lower eigenvector(s) and the rectangular image extracted with a suitable size. In addition to this, there may be applied a method of using a template matching by a shading pattern, which is disclosed in a literature "Makoto Kosugi, 'Human-Face Search and Location in a Scene by Multi-Pyramid Architecture for Personal Identification' by Institute of Electronics, Information and Communication Engineers, Vol. J77-D-II, No4, pp. 672–681, April 1994".

Furthermore, in an identifying method of a face image, the following method may be applied. First, an input face image is projected onto a subspace spanned by a lower order eigenvector(s) among eigenvectors acquired as a result of principal component analysis for numerous face images. The components thus obtained are determined to a characteristic vector. Subsequently, the Euclidian distance between the characteristic vector and that of respective registered images of respective persons. Thereafter, a person having the minimum Euclidian distance is determined to be the identified person. This method is disclosed in a literature, "M. Turk, A. Pentland, 'Face Recognition Using Eigenifaces', Proceedings of IEEE, CVPR91". Furthermore, there may be employed a method of pattern recognition by obtaining a degree of similarity to a target face image using a linear discrimination dictionary compiled with characteristic data of a person, which is disclosed in Japanese Patent Application Laid-Open No. 2000-222576.

The information informing means 3 controlled by the controlling means 7 informs a user about result of identification at the stage where the face detecting and identifying means 2 produces the result of identification of a person, and seeks confirmation that whether or not the result of identification is correct. For example, the information informing means 3 announces, by voice registered in advance and by synthetic voice by computer, a name of a user obtained as a result of identification from a speaker. For another example, the expressing means 3 displays a user's name or a mark indicating a user on a CRT, a liquid crystal display (LCD) monitor, a plasma display panel (PDP), or the like.

The information inputting means 4 controlled by the controlling means 7 acquires, from the user, a response to the result of identification informed by the information informing means 3. The information inputting means 4 distinguishes, for example, user's voice of "yes" or "no" by speech recognition. For another example, the inputting means 4 is equipped with a button(s) so that the user can push the button to input whether or not the identification is correct into the robot.

The identification result reliability calculating means 5 determines, using information from the imaging means 1 and the robot state observing means 6, whether or not a lighting environment just; before executing face identification is suitable for identification.

There are available the following amounts characterizing a lighting environment (namely, conditions used for determining a lighting environment).

[Conditions (Information) Acquired from Imaging Means 1]

1. Contrast in a face area (namely, variance of pixel values in a face area obtained from the face detecting and identifying means 2);

According to a lighting environment, contrast in a detected face area may be weak or strong. Generally, when a face is hardly illuminated, or when a face image is picked up against light, or the like, the contrast in the face area becomes small. If the contrast of the face area is small, characteristics of the face are lost. Thereby, it becomes difficult to execute identification with high accuracy. The contrast of the face area changes according to environments, and has much effect on identifying performance.

2. A ratio of an average pixel value in a face area to that in its background (namely, a ratio of an average pixel value in a face area obtained from the face detecting and identifying means 2 to that in the vicinity of the outside area of the face area);

The ratio of an average pixel value in a face area to that in its background becomes large in backlight. It is disadvantageous to take an image against light because the contrast becomes small and detecting accuracy also becomes lower.

3. An average pixel value in an entire image;

The average pixel value in an entire image reflects brightness in a whole room or an environment. The average pixel value is obtained by adding up a plurality of pixel values and dividing the added pixel values by the number of the pixel values. The brightness in a room has relevance to an amount of light illuminating a face.

As the method for determining these conditions, in the case of above 1, the larger the amount of characteristics is, it is determined that the environment is suitable for identification. In the cases of above 2 and 3, it is determined that the environment is suitable for identification by examining whether or not the respective ratio and average are in a certain range having an upper limit and a lower limit.

[Conditions (Information) Other Than Those Acquired from Camera]

1. Time (morning, daytime, early-evening or night);

A lighting environment differs vastly between a case where there exists natural light slanting in a room from the open air in the daytime and a case where only a lighting(s) in the room is turned on in the nighttime.

2. Whether or not a lighting device(s) is turned on (the robot (robot state observing means 6) acquires whether or not a lighting device is turned on by gearing a lighting device state observing means (not shown) to a lighting device disposed in a room);

3. Whether or not curtains are drawn (the robot (robot state observing means 6) acquires whether or not curtains are drawn by gearing a curtain state observing means (not shown) to curtains disposed in a room);

The information that whether or not a lighting device is turned on and whether or not curtains are drawn has great relevance to whether or not there exist artificial lighting and natural light that are main light sources in a house.

4. A position of the robot in a room (obtaining a position of a robot using information from an encoder set to wheels and from an image);

A position of lighting and a position where natural light streams are fixed in a room, and thereby, where is the robot in a room and from which direction the robot observes a person have much to do with light illuminating a face.

These conditions from 1 to 4 described above can be used to determine whether or not an environment is suitable for identification by judging, using information whether or not a lighting device is turned on and whether or not curtains are drawn, a lighting environment at a time of executing face identification in a present position of the robot.

The robot state observing means 6 acquires information other than that from the camera, which is to be used to determine a lighting environment by the identification result reliability calculating means 5. For example, the robot state observing means 6 comprises at least; one selected from an encoder set to wheels for finding a position of the robot in a room, a lighting device state observing means (not shown) working with (or geared to) a lighting device disposed in a room to determine whether or not lighting is turned on, and a curtain state observing means (not shown) working with curtains to determine whether or not curtains are drawn. In these cases, the means 6 constitutes one or more kinds and each of the members may be single or plural.

The controlling means 7 can control the robot.

The moving means 8 comprises a motor, an axle, wheels or the like to realize move of the robot.

Figure 3:
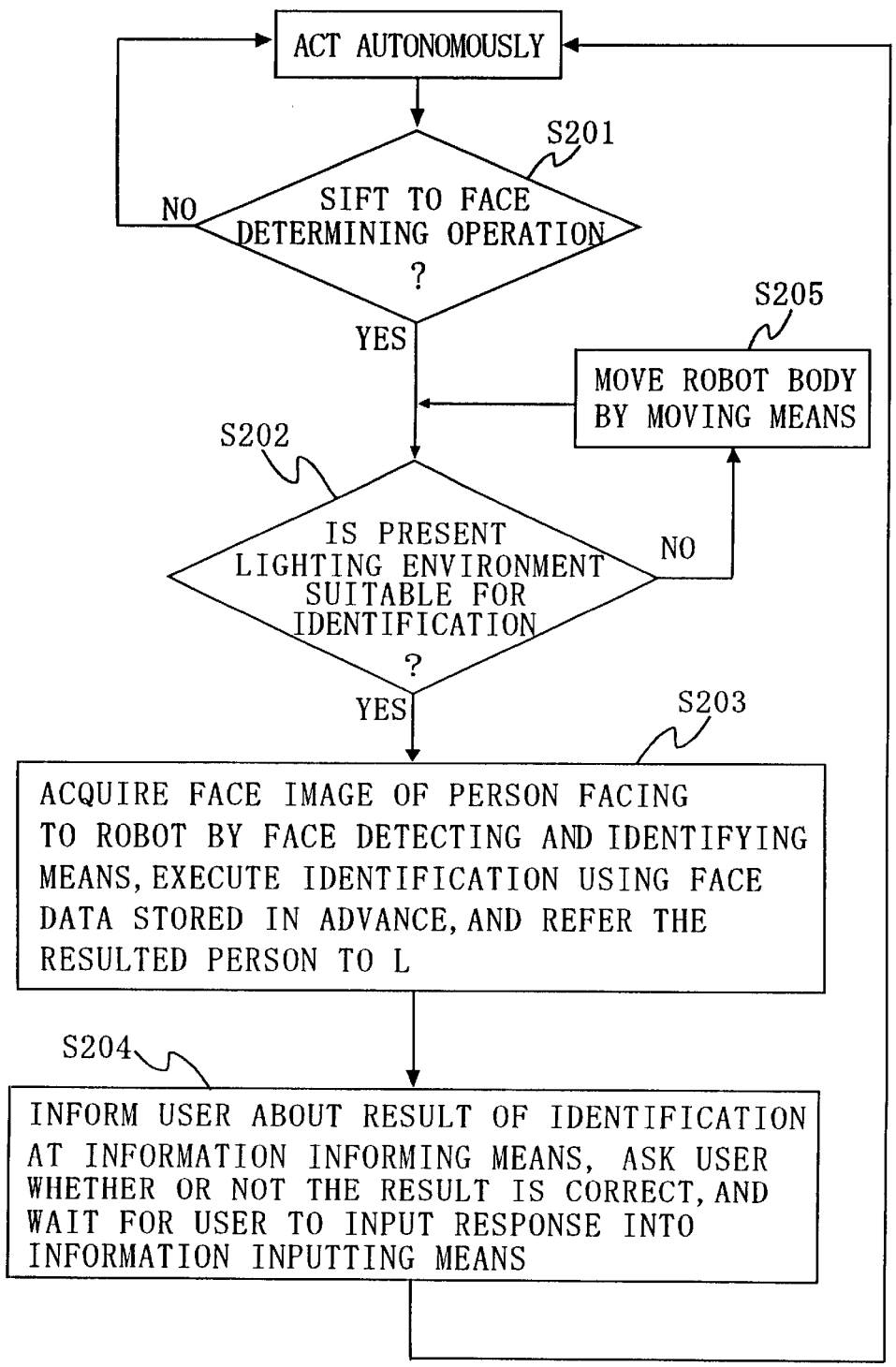
FIG. 3 is a flowchart showing operation according to the first embodiment of the present invention.

Next, in reference to a flowchart of FIG. 3, an explanation will be give of operation of the fist embodiment.

In the first embodiment, first, when the controlling means 7 determines a transition to a state of identifying (determining) a face (Step S201/Yes), an identification result reliability calculating means 5 acquires information from the imaging means 1 and the robot state observing means 6 to determine whether or not the lighting environment in which face identification is tried to be executed is suitable for identification (Step S202).

In the case of Yes in Step S202, the face detecting and identifying means 2 detects a face image from an image obtained at the imaging means 1 and executes identification (matching), and establishes a correspondence between the face image and one of persons registered in advance (Step S203). The person to whom the correspondence is established is referred to L. Subsequently, the information informing means 3 informs the user about the result of identification, and seeks confirmation that whether or not the result of identification is correct from the user (Step S204).

On the other hand, in the case of No in Step S202, the face identification is not executed, and the robot body is moved to another position using the moving means 8 (Step S205), and the lighting environment is observed and judged again as described above. If it is not determined that the environment is suitable for identification no matter how many times the robot is moved, there can be assumed another operation flow such that the face identification is executed.

As described above, in this embodiment, a lighting environment is determined, from a comprehensive standpoint, using information acquired beforehand to execute identification. Furthermore, identification is avoided in a lighting environment not suitable for identification. Thereby, incorrect identification can be reduced. To be concrete, when sufficient contrast is not obtained in a detected face area, or when lighting is turned off, or the like, such environment is determined not to check suitably. In this case, the robot is moved to change its position and direction to try identification again. By this means, incorrect identification can be reduced.

[Second Embodiment]

Next, an explanation will be given of a second embodiment of the present invention referring to drawings.

Figure 4:
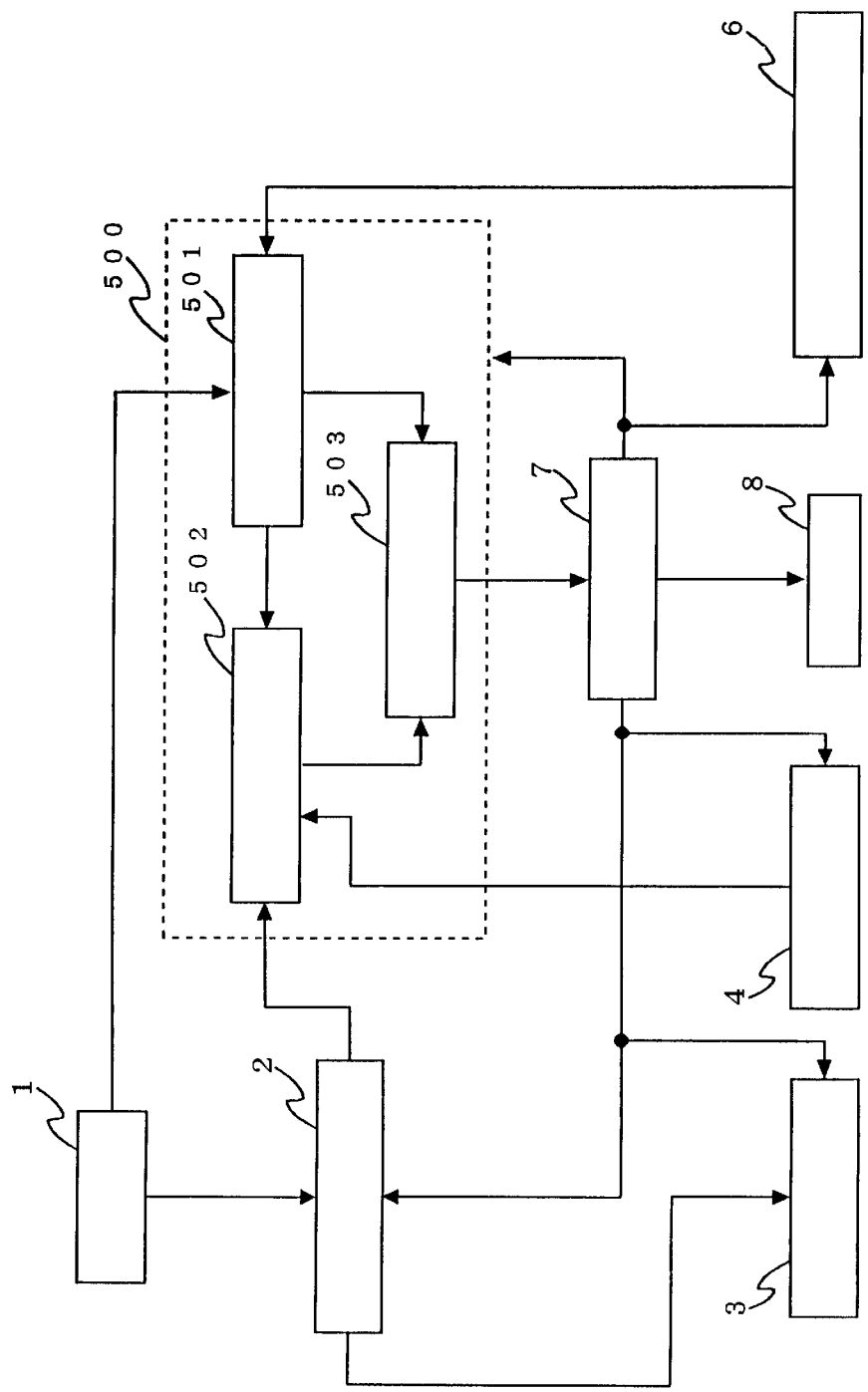
FIG. 4 is a block diagram showing a configuration of a second embodiment of the present invention.

In reference to FIG. 4, the second embodiment of the present invention comprises an imaging means 1, a face detecting and identifying means 2, an information informing means 3, an information inputting means 4, a lighting environment judging means 500, a robot state observing means 6, a controlling means 7, and a moving means 8.

The lighting environment judging means 500 includes a lighting environment determining means 501, an identifying performance recording means 502, and a lighting environment, comparing means 503. The fighting environment determining means 501 determines a lighting environment on the basis of the information (conditions) acquired from the imaging means 1 and the information (conditions) other than that acquired from a camera, for example, time, and other information. Further, the means 501 determines which predetermined category corresponds to the lighting environment. The identifying performance recording means 502 records, according to identification result (correct or incorrect) information obtained at the information inputting means 4, the category to which the lighting environment at that time belongs, which is determined at the lighting environment determining means 501, number of times where face identification has been correct, number of times where face identification has been executed, and so forth. The lighting environment comparing means 503 determines, on the basis of information recorded in the identifying performance recording means 502, whether or not the present lighting environment determined by the lighting environment determining means 501 is suitable for identification.

Figure 5:
FIG. 5 is a diagram showing a method for categorizing a lighting environment at a lighting environment determining means according to the second embodiment of the present invention.

The lighting environment determining means 501 determines, using information from the imaging means 1 and the robot state observing means 6, conditions (or information) of a lighting environment before executing face identification. The conditions for determining a lighting environment (amounts that characterize a lighting environment) are the same as the first embodiment as described above, and thereby, the explanation will be abbreviated. A lighting environment is judged using one or more conditions. To be concrete, a table as shown in FIG. 5 is arranged to categorize a lighting environment. Namely, the lighting environment determining means 501 observes amounts as described above before executing face identification. Subsequently, from result of the observation, the determining means 501 determines, on the basis of the predetermined table, which category belongs to a present lighting environment, and outputs the result.

The identifying performance recording means 502 records, per predetermined category, number of times where face identification has been successful (correct) and number of times where identification has been executed on the basis of identification result (correct or incorrect) information obtained at the information inputting means 4 in the form as shown in FIG. 6.

The lighting environment comparing means 503 retrieves, from the identifying performance recording means 502, identifying performance in the same lighting environment as that obtained from the lighting environment determining means 501. 1. If an accumulating total of number of times where identification has been executed (t(K)) is equal to or more than a predetermined threshold value and 2. if an identifying performance value calculated by dividing the accumulating total of number of times where face identification has been successful (hereinafter referred to r(K)) by the accumulating total of number of times where identification has been executed (hereinafter referred to (tK)) is equal to or more than a predetermined threshold value (hereinafter referred to R), the comparing means 503 determines that the result of identification possesses higher reliability in the environment. Otherwise (when t(K) is less than the threshold value, or t(K) is equal to or more than the threshold value and r(i)/t(K) is less than R), the comparing means 503 determines that the result of identification possesses lower reliability in the environment.

Incidentally, each operation of the imaging means 1, the face detecting and identifying means 2, the information informing means 3, the information inputting means 4, the robot state observing means 6, the controlling means 7, and the moving means 8 is the same as that explained in the first embodiment. Thereby, the explanation thereof will be abbreviated.

Figure 7:
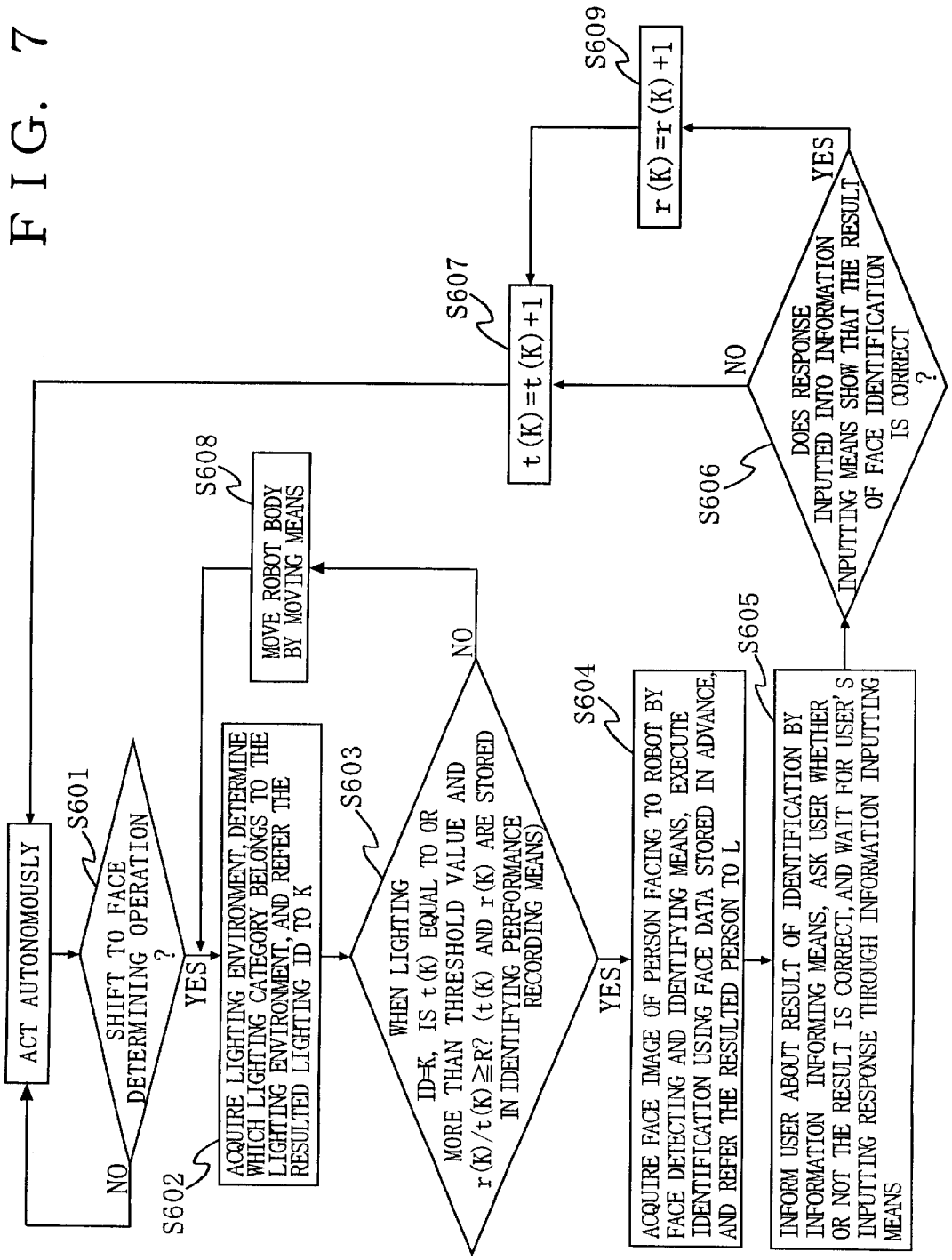
FIG. 7 is a flowchart showing operation according to the second embodiment of the present invention.

Next, an explanation will be given of operation of the second embodiment in reference to a flowchart of FIG. 7.

In the second embodiment, first, when the controlling means 7 determines a transition from a state of autonomous action to a state of identifying a face (Step S601/Yes), the lighting environment determining means 501 determines, using information from the imaging means 1 and the robot state observing means 6, the lighting environment before executing face identification to classify the environment into a category shown in FIG. 5 as described above (Step S602). This category is referred to a lighting category hereinafter. There is assigned an ID to the lighting category, and the ID is referred to a lighting ID. The lighting ID determined here is referred to K.

Thereafter, the lighting environment comparing means 503 searches the identifying performance recording means 502 for identifying performance when the lighting ID obtained from the lighting environment determining means 501 is K. 1. If t(K) is equal to or more than the predetermined threshold value and 2. if an identifying performance value calculated by dividing r(K) by t(K) is equal to or more than R (Step S603/Yes), the comparing means 503 determines that the result of identification possesses higher reliability in the environment. Otherwise (Step S603/No), the comparing means 503 determines that the result of identification possesses lower reliability in the environment. Incidentally, the following operation may be assumed: when t(K) is less than the threshold value, face identification is executed without condition: subsequently, t(K) is incremented; and if the identification succeeded, r(K) is also incremented.

When the lighting environment comparing means 503 determines that the reliability in identification is high (Step S603/Yes), the face detecting and identifying means 2 detects a face image from an image picked up by the imaging means 1 to execute identification (matching), and establishes a correspondence between the face image and one of persons registered in advance (Step S604). The person to whom the correspondence is established is referred to L. Subsequently, the information informing means 3 informs the user about the result of identification (matching), and seeks confirmation that whether or not the result of identification is correct from the user (Step S605). The information inputting means 4 acquires a response from the user to determine whether the identification was correct or incorrect (Step S606). If the identification was correct (Step S606/Yes), t(K) when the lighting ID was K and r(K) when the lighting ID was K are incremented by 1, respectively (Steps S607 and S609). Subsequently, the robot goes back to autonomous action such as communication with the user. On the other hand, if the identification was incorrect (Step S606/No), t(K) is incremented by 1 (Step S607), and the robot goes back to autonomous action such as communication with the user.

On the other hand, when the lighting environment comparing means 503 determines that the reliability is low (Step S603/No), the face identification is not executed, and the robot body is moved to another position using the moving means 8 (Step S608). Subsequently, the operation goes back to Step S602 to observe and judge the lighting environment again. If it is not determined that the environment is suitable for identification no matter how many times the robot is moved, there can be assumed another operation flow such that the face identification may be executed. For example, a threshold value is set, and when exceeding the threshold value, there is executed an image input for face identification compulsorily. Incidentally, it is preferable to produce natural behavior so that a user may not feel something is wrong with move of the robot.

In this embodiment as described above, each time face identification is executed, a lighting environment and number of times of correct or incorrect identification are converted into data to accumulate and store the number of times. After the accumulation has been substantially executed, a lighting environment is observed when identification is executed, and the ratio of correct identification in the past in the same lighting environment as that at present is referred. If the number of times where correct identification was few in the lighting environment, the robot is moved to change its position and direction without execution of identification until the robot arrives at a place where a lighting environment is suitable for identification (it is preferable to set an upper limit to the number of times of re-identification). By this means, incorrect identification can be reduced by avoiding execution of identification in an environment wherein the result of identification was bad.

There are diverse variations of lighting environments and of states in face registration in each different home. Therefore, it is difficult to design the robot after predicting in advance which lighting environment leads to successful identification with high accuracy. In the present invention, it is possible to provide a user with a chance to learn which place and which lighting environment lead to unsuccessful identification at the stage where the user uses the robot actually, and thereby, the user can learn conditions under which identification will succeed. In other wards, by bringing the user improvement of lighting conditions, it is possible to propose return to health of environment in the field of view. Thereby, it becomes possible to execute identification with high accuracy compared to a case of predicting in advance lighting conditions difficult to realize successful identification.

[Third Embodiment]

Next, an explanation will be given in detail of a third embodiment of the present invention referring to drawings.

Figure 8:
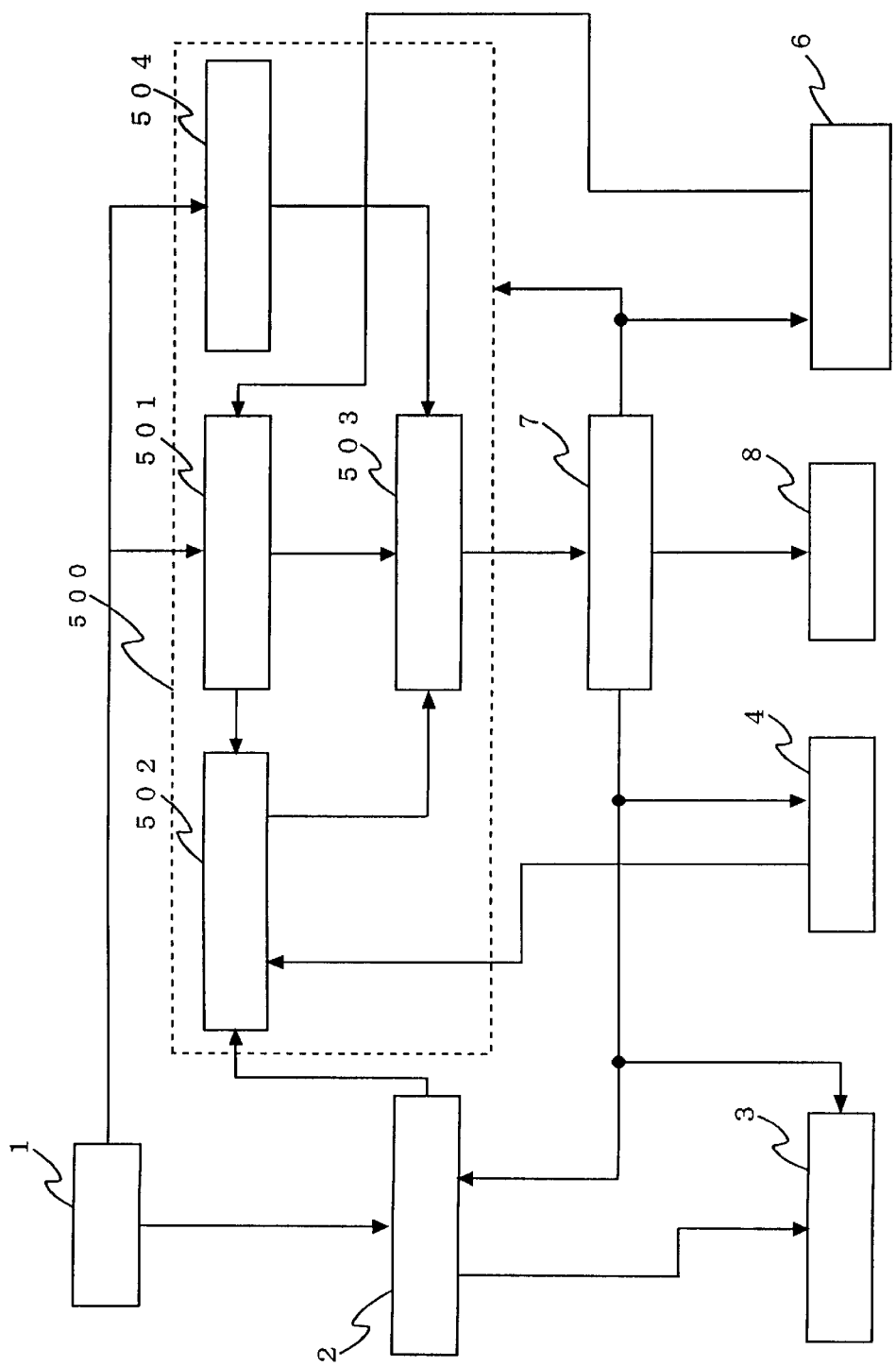
FIG. 8 is a block diagram showing a configuration of a third embodiment of the present invention.

As shown in FIG. 8, the third embodiment of the present invention comprises, in addition to the second embodiment, an overall characteristic amount extracting means 504 extracting amounts of overall characteristics of a person.

The overall characteristic amount extracting means 504 controlled by the controlling means 7 extracts, from an image picked up by the imaging means 1, amounts of characteristics by which a person can be identified. The overall characteristic amount extracting means 504 registers amounts of characteristics per person in advance to compile a dictionary. The extracting means 504 extracts amounts of characteristic to identify a user from an image picked up by the imaging means 1 referring to the dictionary. The amounts of characteristics registered in the dictionary are information that characterizes a user, which is concerned with physical characterizing regions, or combination of the physical characterizing regions and accessories, for example, a user's height, figure, hairstyle, whether or not a user puts on glasses, etc. When succeeded in extracting amounts of overall characteristics, the overall characteristic amount extracting means 504 outputs, to the lighting environment comparing means 503, information indicating that amounts of characteristics are found. On the other hand, when failed in extracting, the extracting means 504 outputs, to the comparing means 503, information indicating that amounts of characteristics are not found.

The lighting environment comparing means 503 changes, according to the result whether the extracting means 504 succeeded or failed in extraction, a threshold value by which identifying performance in a lighting category determined by the lighting environment determining means 501 is judged. Subsequently, the extracting means 504 determines identifying performance.

Figure 9:
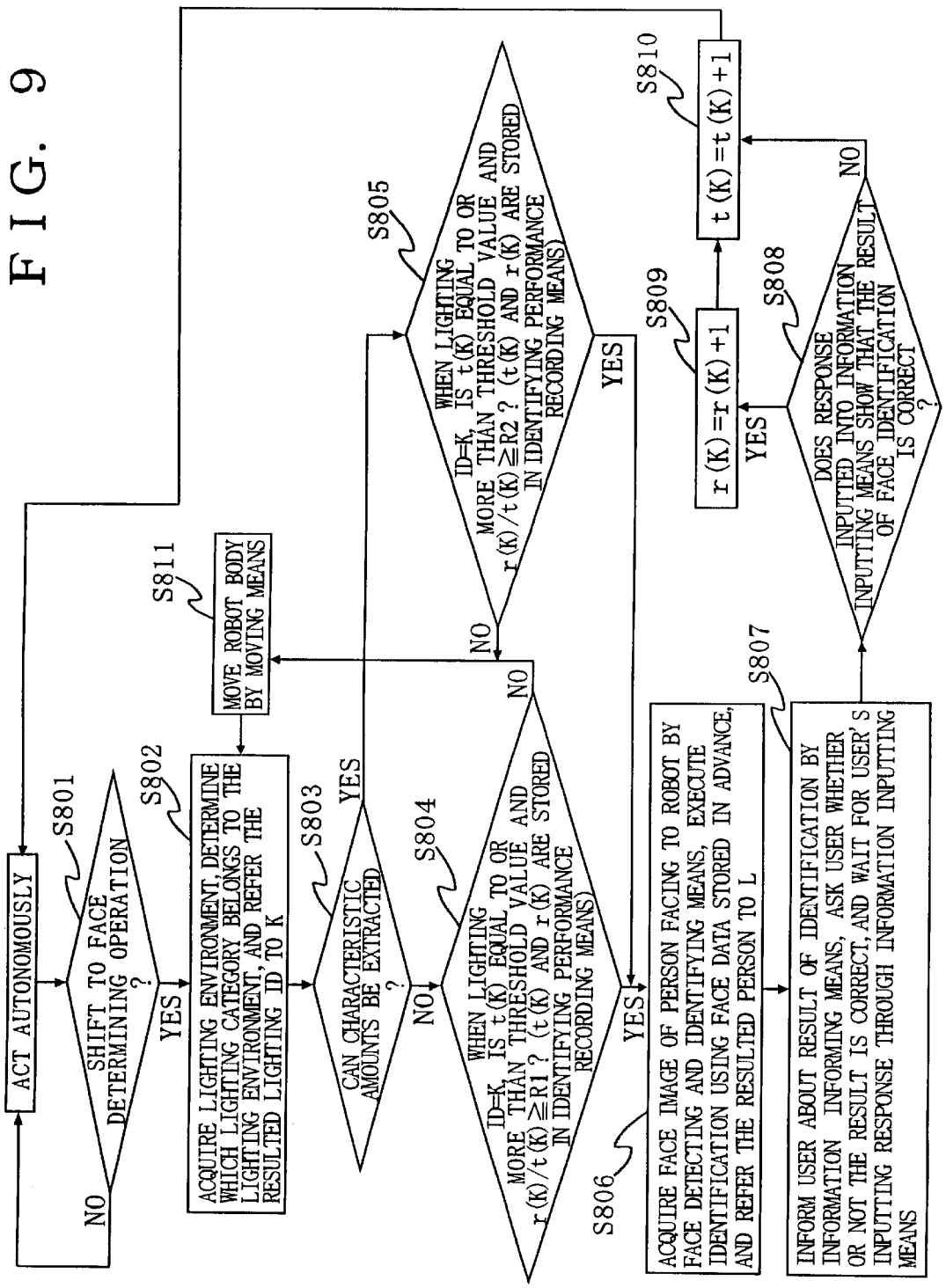
FIG. 9 is a flowchart showing operation according to the third embodiment of the present invention.

Next, referring to FIG. 9, operation of this embodiment will be explained.

First, when the controlling means 7 determines a transition from a state of autonomous action to a state of executing face identification (Step S801/Yes), the lighting environment determining means 501 determines, using information from the imaging means 1 and the robot state observing means 6, the lighting environment before executing face identification to classify the environment into a lighting category (Step S802). Incidentally, the ID of the lighting category determined at this step is referred to K.

Moreover, while referring to the dictionary, the overall characteristic amount extracting means 504 tries to extract, from an image picked up by the imaging means 1, amounts of characteristics by which a user can be identified (Step S803). When succeeded in extracting amounts of characteristics (Step S803/Yes), the extracting means 504 outputs, to the lighting environment comparing means 503, information that amounts of characteristics are found. On the other hand, when failed in extracting amounts of characteristics (Step S803/No), the extracting means 504 outputs, to the comparing means 503, information that amounts of characteristics are not found.

Having acquired information of the lighting ID from the lighting environment determining means 501 as well as having acquired information that whether or not the amounts of characteristics are found from the overall characteristic amount extracting means 504, the lighting environment comparing means 503 searches the identifying performance recording means 502 for identifying performance when the lighting ID was K.

In the case of No in Step S803, the lighting environment comparing means 503 compares an identifying performance value calculated by dividing r(K) by t(K) with a threshold value (referred to as R1) used in the second embodiment as described above (Step S804). On the other hand, in the case of Yes in Step S803, the comparing means 503 compares the identifying performance value with a threshold value (referred to as R2) set lower than R1 (Step S805).

When t(K) is equal to or more than the threshold value and when the identifying performance value is equal to or more than R1 or R2, the lighting environment comparing means 503 determines that the reliability of the identifying performance in the environment is high. Otherwise, the comparing means 503 determines that the reliability of the identifying performance in the environment is low. Incidentally, the following operation after Steps S804 and S805 in the flowchart shown in FIG. 9 is the same as that after Step S603 in the second embodiment having explained with FIG. 7, and thereby, the explanation will be abbreviated.

As described above, in the third embodiment, it is possible to execute user identification having high accuracy by introducing, as conditions for judging a user, amounts of characteristics by which a user can be identified in addition to a lighting environment.

[Fourth Embodiment]

Next, an explanation will be given of a fourth embodiment of the present invention referring to drawings.

Figure 10:
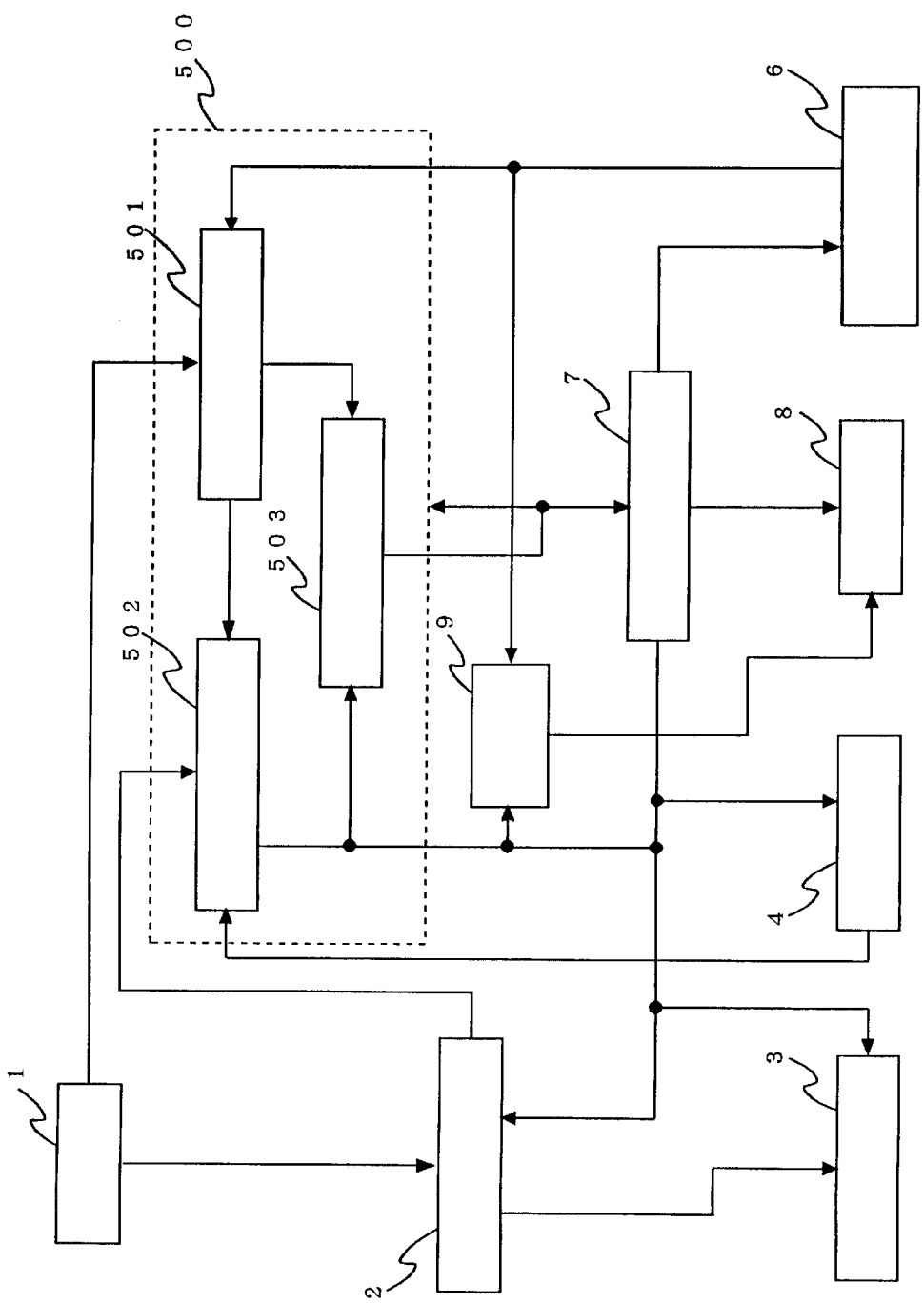
FIG. 10 is a block diagram showing a configuration of a fourth embodiment of the present invention.

In reference to FIG. 10, the fourth embodiment of the present invention comprises, in addition to the configuration of the second embodiment, a moving plan making means 9 designing a moving plan to move to a position suitable for identification.

In this embodiment, as shown in FIG. 11, a room is divided into several areas each to which a discrimination ID is assigned for control. Moreover, as shown in FIG. 12, the identifying performance recording means 502 records a lighting category and identifying performance therein with respect to each area to which each discrimination ID is assigned.

Furthermore, the robot state observing means 6 in this embodiment acquires, from a lighting device state observing means (not shown), information of state of a lighting device, and acquires, from a curtain state observing means (not shown), information of state of curtains. Incidentally, the lighting device state observing means works with (or interacts remotely) a lighting device disposed in a room to detect whether or not a lighting device is turned on. Furthermore, the curtain state observing means works with curtains disposed in a room to detect whether or not curtains are drawn.

The moving plan making means 9 acquires positional information of the robot at present from the robot state observing means 6. Then, the means 9 searches the identifying performance recording means 502 for identifying performance. Subsequently, the moving plan making means 9 makes a moving plan so as to move the robot to a position showing an identifying performance value higher than that in a present position, and issues instructions to the moving means 8. To be concrete, the means 9 acquires an identifying performance value in a lighting category wherein states of time, curtains and a lighting device are the same as those in a present. The identifying performance value is calculated by dividing an accumulating total of number of times where face identification has been successful by an accumulating total of number of times where identification has been executed in the lighting category. Subsequently, the means 9 issues instructions to move to a position where the identifying performance value is equal to or more than itself and is equal to or more than a threshold value, or to move to a position where the value is equal to or more than itself and is the highest.

Furthermore, the moving plan making means 9 may determine an arrival point in consideration of an identifying performance value in a moving distance. In this case, the moving plan making means 9 designs a moving plan so as to move into an area where identifying performance in the same lighting category as the present one is equal to or more than that in a present position and where a moving distance calculated using positional information at present obtained from the robot state observing means 6 is shorter.

As described above, in this embodiment, it is possible to lead a user toward a good lighting environment by executing, in a lighting category wherein states of time, curtains and a lighting device are the same as those in a present, move into a place where an identifying performance value is equal to or more than a threshold value, or is the highest.

[Fifth Embodiment]

Next, a detail explanation will be given of a fifth embodiment of the present invention referring to drawings. This embodiment relates to a method for registering a face image in the face detecting and identifying means 2.

Figure 13:
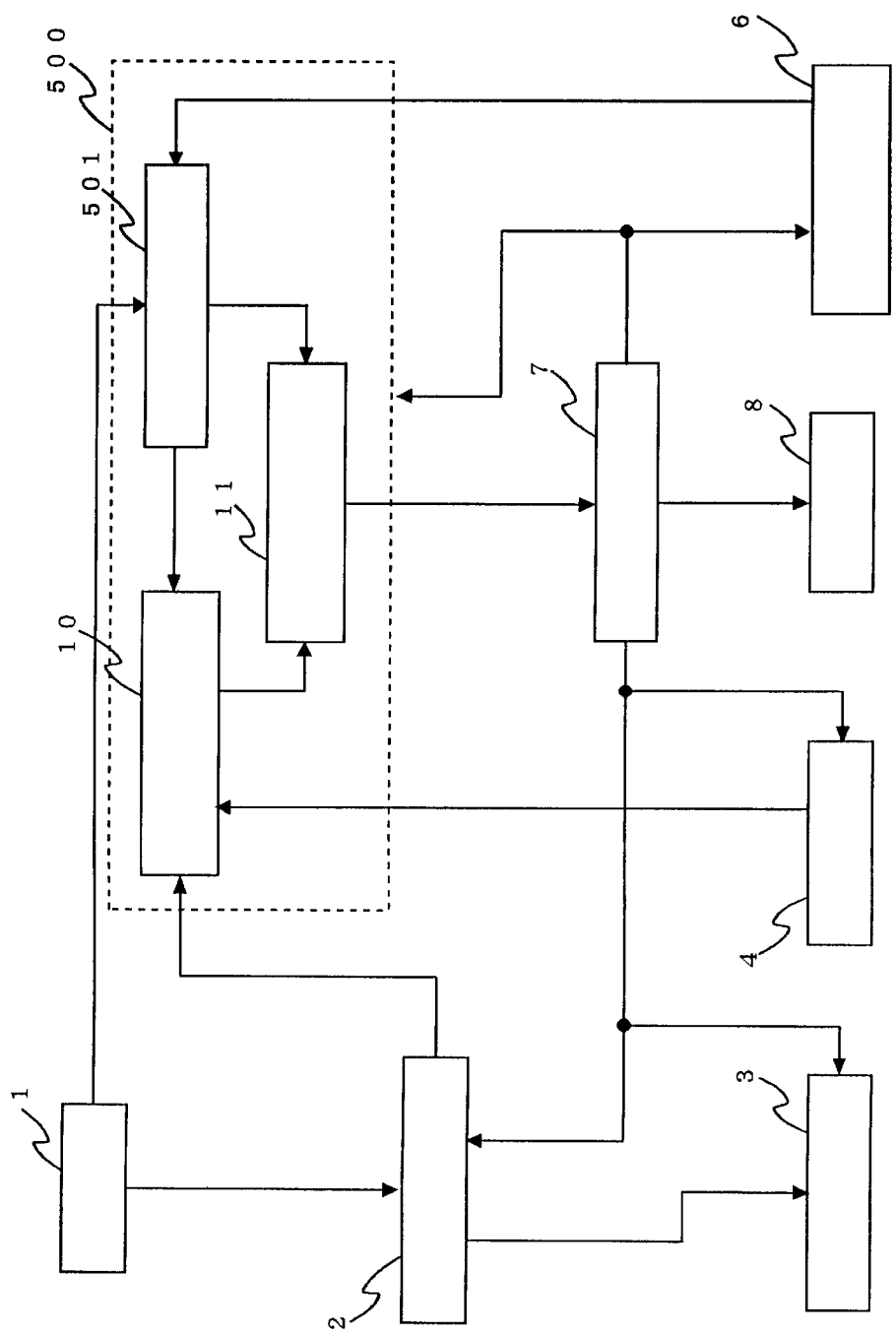
FIG. 13 is a block diagram showing a configuration of a fifth embodiment of the present invention.

In reference to FIG. 13, the lighting environment judging means 500 in the fifth embodiment of the present invention comprises a lighting environment determining means 501, a lighting environment at registration recording means 10 and a lighting environment at registration comparing means 11. The lighting environment determining means 501 judges a lighting environment on the basis of the information acquired from the imaging means 1 and the information other than that acquired from a camera, and determines which predetermined category corresponds to the lighting environment. The lighting environment at registration recording means 10 stores, with respect to each user, a lighting ID when a face (image) was registered in the face detecting and identifying means 2. The lighting environment at registration comparing means 11 determines, on the basis of information recorded in the lighting environment at registration recording means 10, whether or not a user who is communicating with the robot at present has executed face registration in the same lighting environment as that in the present in the past.

The lighting environment at registration recording means 10 records, by each user, all lighting IDs at the time of registering a face (image) in the face detecting and identifying means 2, the IDs having been determined by the means 501.

The lighting environment at registration comparing means 11 determines, by searching for information recorded in the lighting environment at registration recording means 10, whether or not a user who is communicating with the robot has executed a face registration in the past in the same lighting environment as the present lighting environment obtained from the lighting environment determining means 501.

Figure 14:
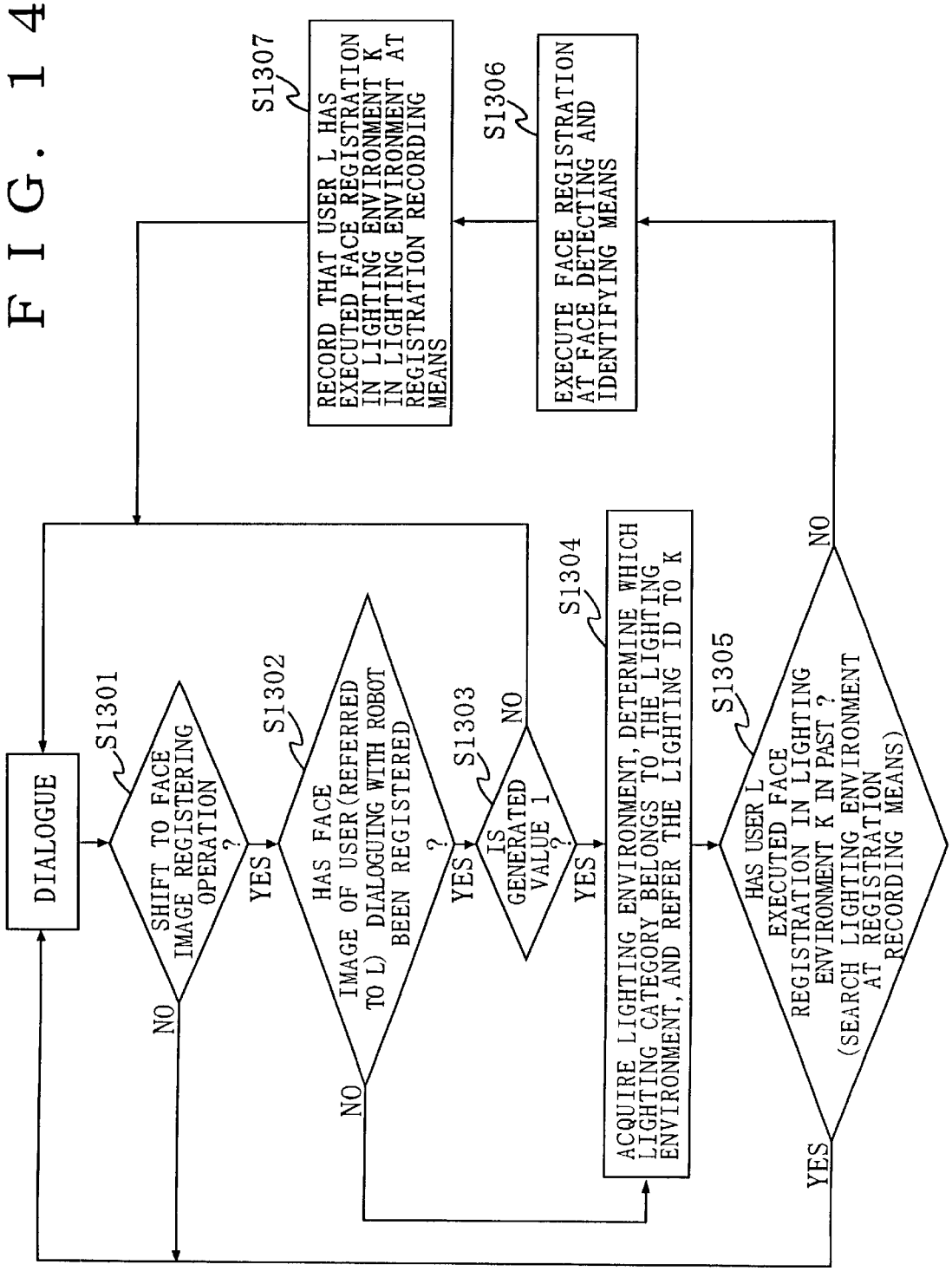
FIG. 14 is a flowchart showing operation according to the fifth embodiment of the present invention.

Thereafter, an explanation will be given of operating procedure of this embodiment referring a flowchart of FIG. 14.

During a state where the robot is dialoguing with the user L, this state is transferred, with a certain probability, to a state of determining whether or not a registration is executed (Step S1301/Yes). First, it is examined whether or not a face image of a user who is communicating with the robot has been registered in the face detecting and identifying means 2 (Step S1302). If the image has not been registered (Step S1302/No), the operation is followed by Step 1304 without condition. Otherwise (Step S1302/Yes), the operation is shifted to Step S1304 with probability 1/10 and is shifted back to the state of communication with the user with probability 9/10. In other words, a natural number selected from 1 to 10 is generated randomly, and when the generated value is 1 (Step S1303/Yes), the operation is shifted to Step S1304. At Step 1304, the lighting environment determining means 501 classifies the lighting environment at the time into a predetermined lighting category. The resulted lighting ID of the category is referred to K. Then, it is determined, on the basis of information recorded in the lighting environment at registration recording means 10, whether or not the user L who is communicating with the robot has executed a face registration in the past in an environment where the lighting ID was K (Step S1305). If the face registration has been executed (Step S1305/Yes), the operation goes back to a state of communication with the robot. Otherwise (Step 1305/No), the operation is shifted to Step S1306. At Step S1306, the face detecting and identifying means 2 executes a face registration of the user L. Subsequently, the lighting environment at registration recording means 10 records that the user L has registered his/her face when the lighting ID=K (Step S1307).

As described above, in this embodiment, a lighting state at registration is stored every user. Subsequently, if there exists, while a user is communicating with the robot, such a lighting environment in which the user has not executed a face registration in the past, a registration of the user's face is started. By this means, it becomes possible to register face images under various lighting conditions efficiently.

Incidentally, in the above embodiment, the communication with the user and the face registration are described as independent operation, respectively. However, the shooting of a face image may be executed during the communication.

[Sixth Embodiment]

Next, an explanation will be given of a sixth embodiment of the present invention referring to drawings.

Figure 15:
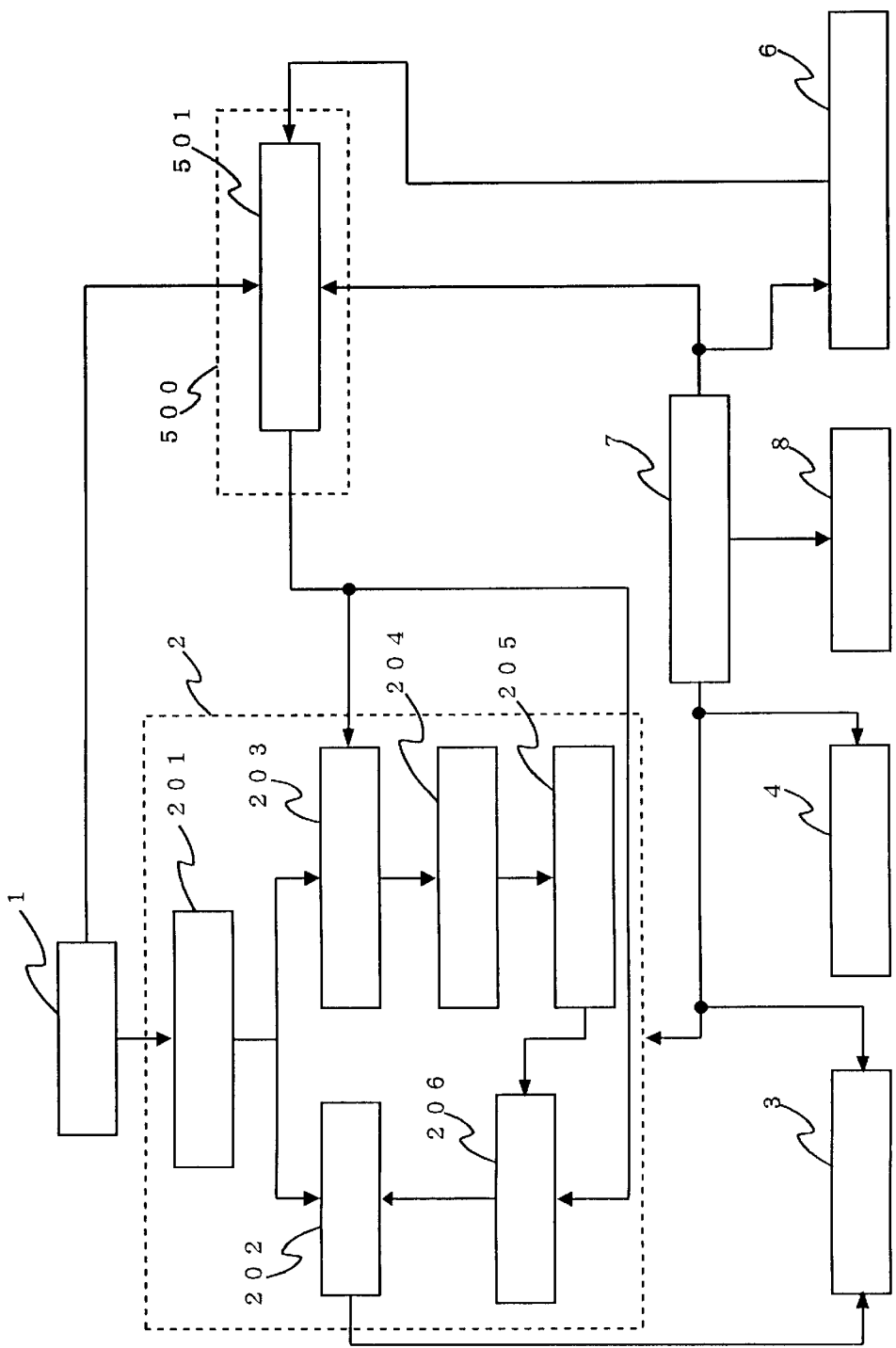
FIG. 15 is a block diagram showing a configuration of a sixth embodiment of the present invention.

In reference to FIG. 15, a configuration of this embodiment is the same as that in the second embodiment except for configurations of a lighting environment judging means 500 and a face detecting and identifying means 2. The lighting environment judging means 500 in this embodiment consists of a lighting environment determining means 501. Moreover, the face detecting and identifying means 2 includes a face detecting means 201, a data controlling means 203, a dictionary compiling means 204, a dictionary storing means 205, a dictionary selecting means 206, and a face identifying means 202. The face detecting means 201 detects and extracts a face area from an image obtained from the imaging means 1, and converts it to characteristic data. The data controlling means 203 stores, every lighting category obtained at the lighting environment determining means 501, a characteristic data group with respect to each person. The dictionary compiling means 204 compiles a recognition dictionary using the characteristic data of each lighting category. The dictionary storing means 205 stores the recognition dictionary compiled at the dictionary compiling means 204 in each lighting category. The dictionary selecting means 206 selects, from the dictionary storing means 205, a dictionary of the same lighting category as that outputted from the lighting environment determining means 501 to supply it to the face identifying means 202. The face identifying means 202 executes identification on the basis of the dictionary supplied from the dictionary selecting means 206 to determine whose face the characteristic data supplied form the face detecting means 201 indicates.

Figure 16:
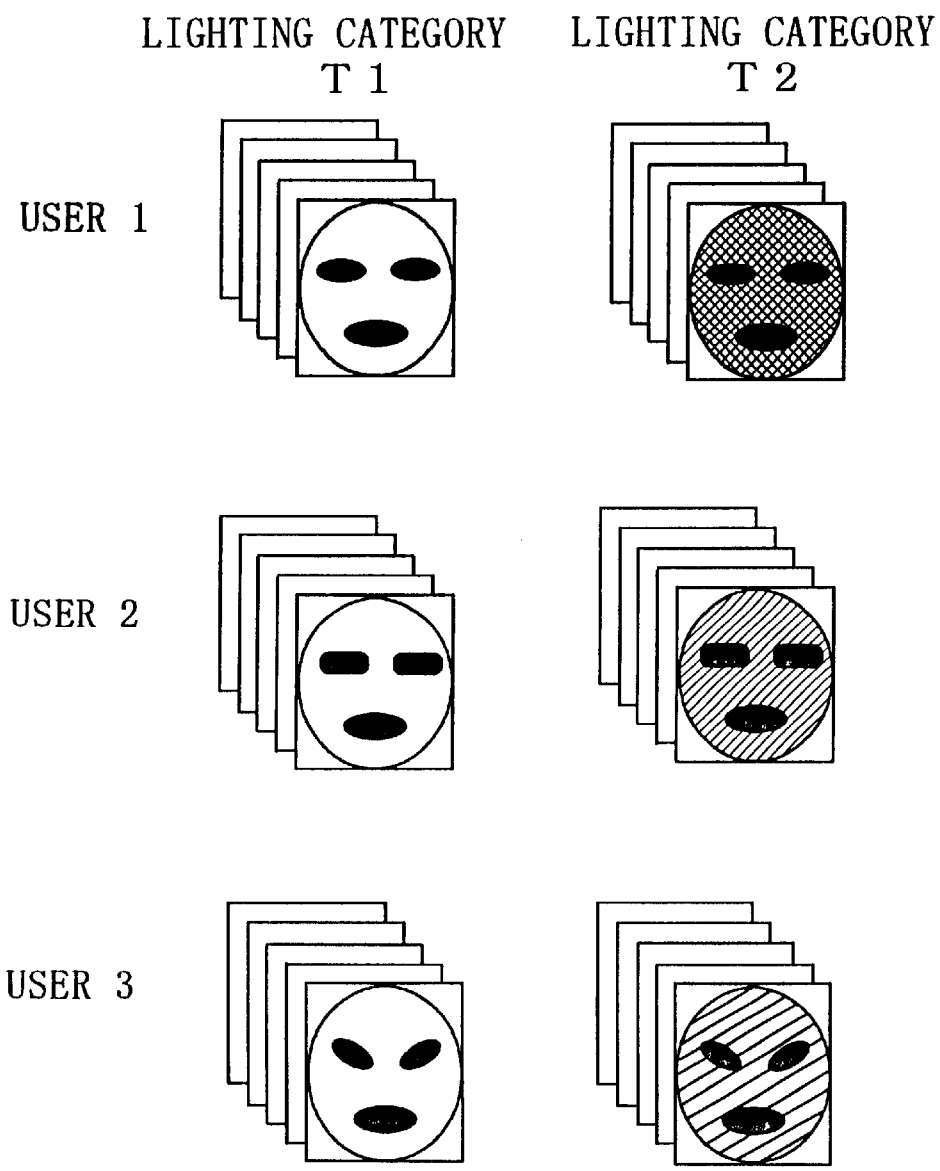
FIG. 16 is a diagram showing an example of storing, per lighting category, a characteristic data group of a face of each person obtained at registration at a data controlling means according to the sixth embodiment of the present invention.

The data controlling means 203 stores each characteristic data group of face with respect to each person acquired at registration in each lighting category obtained at the lighting environment determining means 501 as shown in FIG. 16. There may be employed a method to extract the characteristic data from a face image, which disclosed in Japanese Patent Application Laid-Open No. 2000-222576. In the application, there is disclosed a method of scanning the front face image from left to right line after line, and whenever it completes the scanning of one line, scanning the next line as in the descending order, and generating one-dimensional data called "luster scan", which is outputted for use as characteristic data. As an alternative luster scan method, the front face image may be filtered through a linear or a quadratic differential filter, and edge data thus extracted may be luster scanned to obtain characteristic data.

Figure 17:
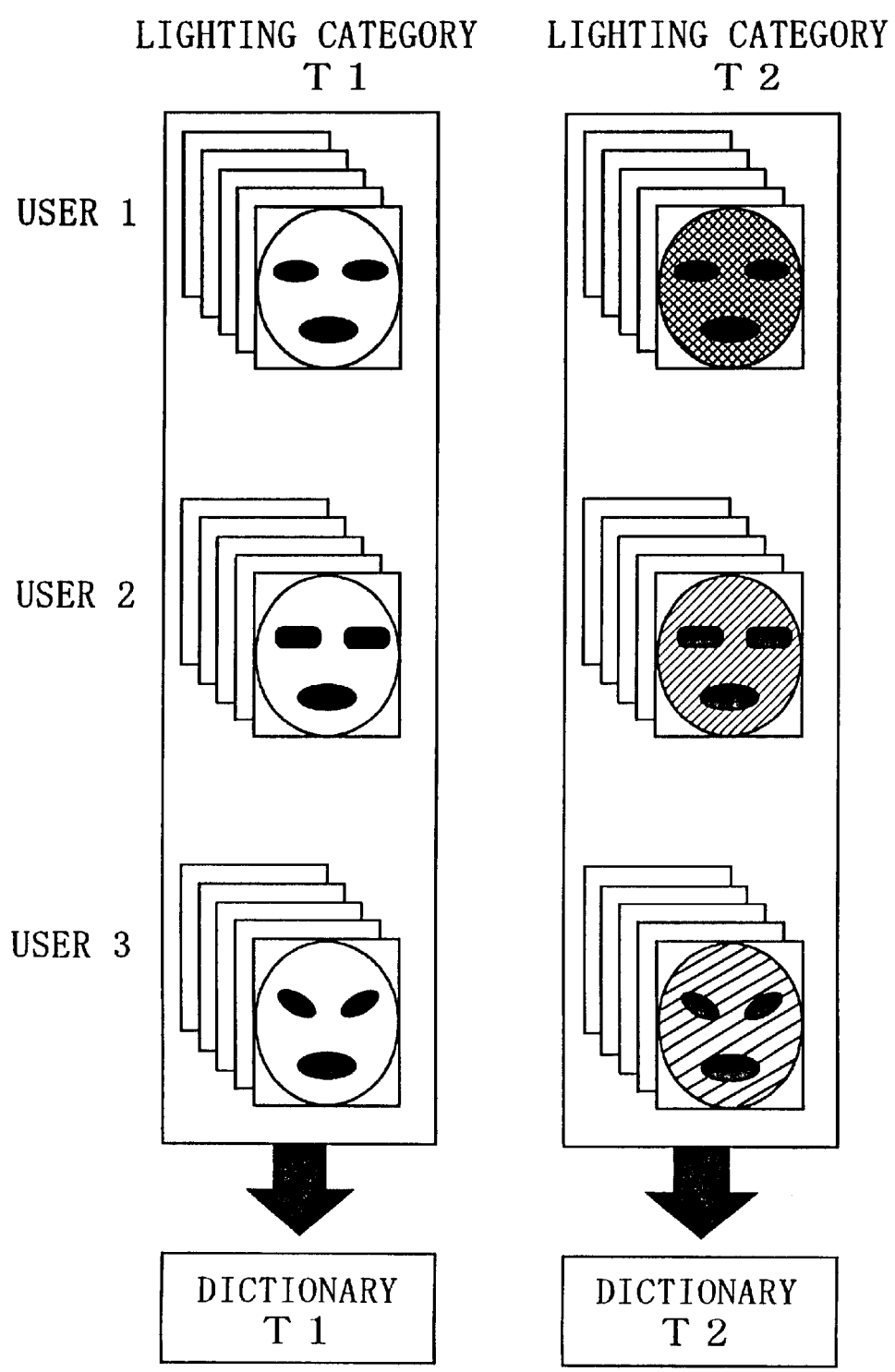
FIG. 17 is a diagram showing an example of compiling a recognition dictionary using only characteristic data in one lighting category at a dictionary compiling means according to the sixth embodiment of the present invention.

The dictionary compiling means 204 compiles a recognition dictionary using only characteristic data of one lighting category. As shown in FIG. 17, each dictionary is compiled using respective data sets of lighting IDs T1 and T2. A linear discrimination dictionary compiled with characteristic data of a person may be employed, which is disclosed in the above application. Each dictionary is stored per lighting category at the dictionary storing means 205.

Figure 18:
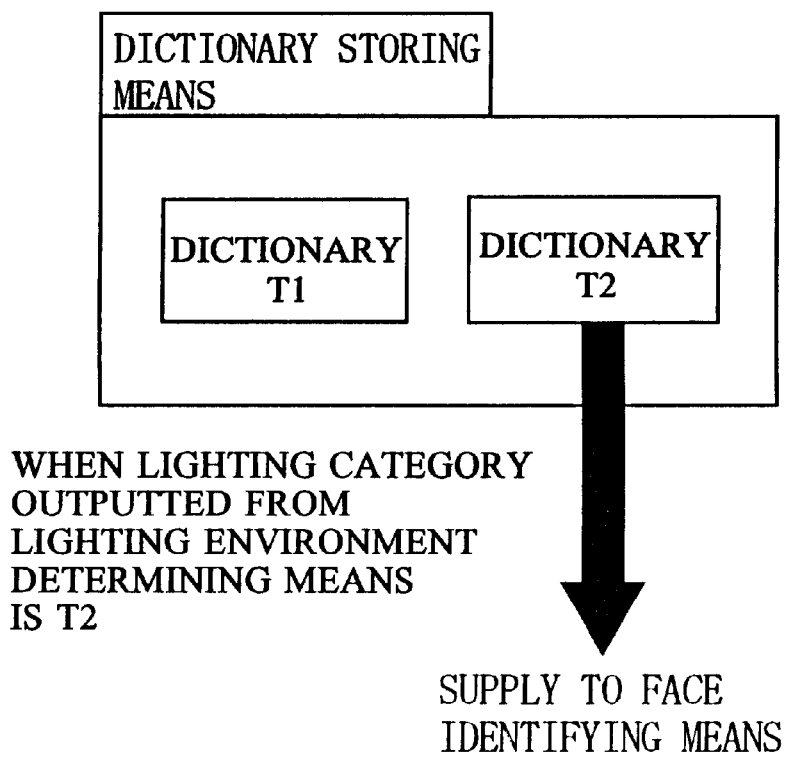
FIG. 18 is a diagram showing an example of supplying, to a face identifying means, a dictionary compiled with data in a certain lighting category at a dictionary selecting means according to the sixth embodiment of the present invention.

The dictionary selecting means 206 supplies the dictionary compiled using the data of the lighting category determined at the lighting environment determining means 501 to the face identifying means 202. In the example of FIG. 18, a dictionary at T2 is supplied to the dictionary storing means 205, the dictionary being stored in the dictionary storing means 205.

The face identifying means 202 executes identification of the characteristic data supplied from the face detecting means 201 using the supplied dictionary. To be concrete, there may be applied a method of pattern recognition by obtaining a degree of similarity to a target face image using a linear discrimination dictionary compiled with characteristic data of a person, which is disclosed in the above described application.

Next, an explanation will be given of operating of this embodiment referring to flowcharts of FIGS. 19 and 20.

Figure 19:
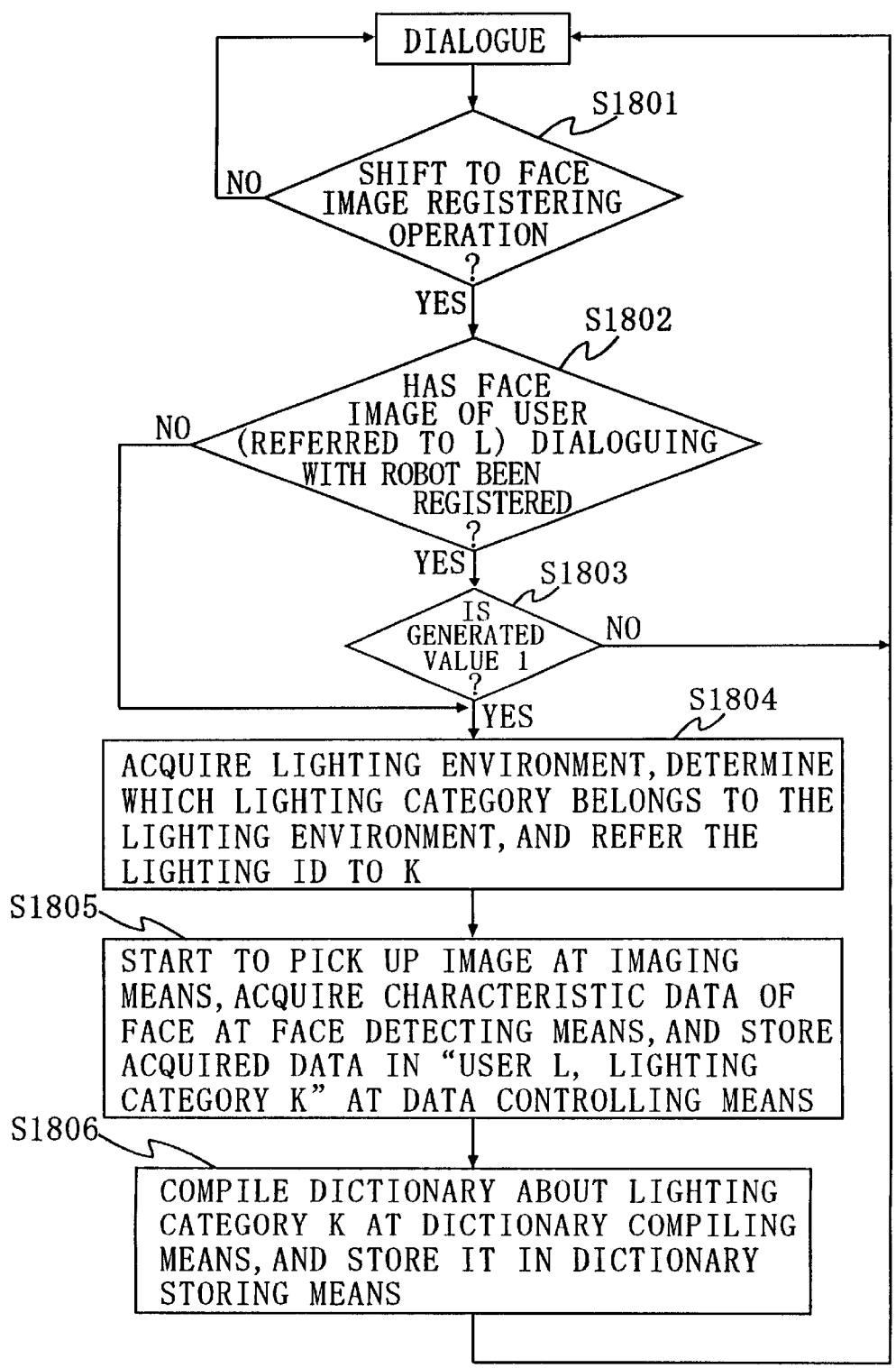
FIG. 19 is a flowchart showing operation (at face registration) according to the sixth embodiment of the present invention.
Figure 20:
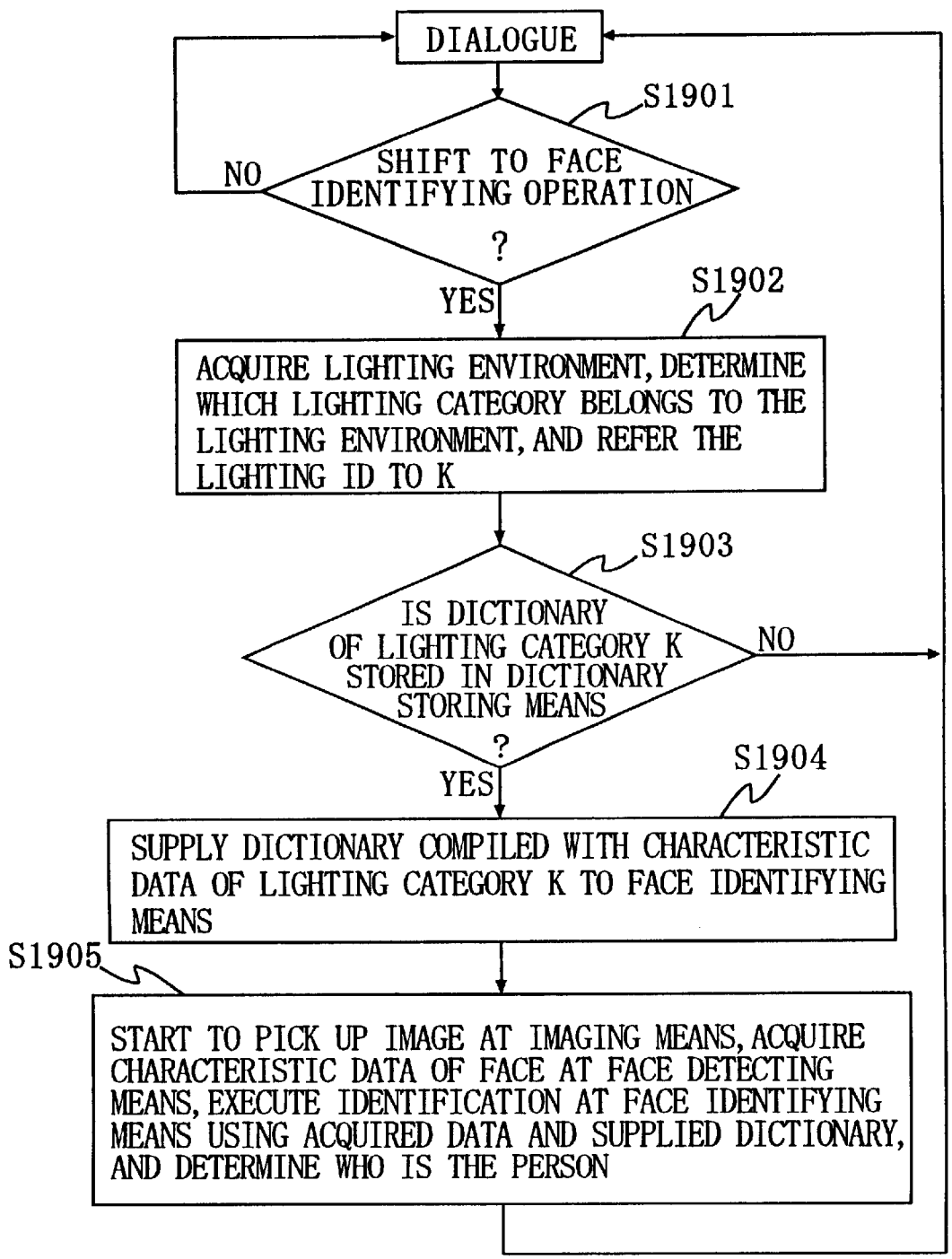
FIG. 20 is a flowchart showing operation (at face identification) according to the sixth embodiment of the present invention.

First, an explanation will be give of operation at face registration on the basis of FIG. 19. During a state where the robot is communicating with the user L, this state is transferred, with certain probability, to a state where it is determined whether or not a registration is executed (Step S1801/Yes). First, it is examined whether or not the face image of the user who is communicating with the robot has been registered in the face detecting and identifying means 2 (Step S1802). If the image has not been registered (Step 1802/No), the operation is followed by Step 1804 without condition. Otherwise (Step 1802/Yes), the operation is shifted to Step S1804 with probability 1/10 and is shifted back to the state of communication with the user with probability 9/10. To be concrete, a natural number selected from 1 to 10 is generated randomly, and when the generated value is 1 (Step S1803/Yes), the operation is shifted to Step 1804. At Step 1804, the lighting environment determining means 501 classifies the lighting environment at the time into a predetermined lighting category. The lighting ID acquired at the lighting environment determining means 501 is referred to K. Next, the imaging means 1 starts to take video, the face detecting means 201 acquires characteristic data of the face from the video, and the acquired data is stored in an area of "USER L, LIGHTING CATEGORY K" in the data controlling means 203 (Step S1805). Generally, a plurality of images are obtained at one registration, and thereby, Step S1805 is continued until all characteristic data is acquired. After the finish of the acquisition, the operation proceeds to Step S1806. In this step, the dictionary compiling means 204 compiles a dictionary as to data wherein the lighting ID is K, and stores the compiled dictionary in the dictionary storing means 205. At this time, if there has not been obtained data wherein the lighting ID was K of all persons registered in advance, the processing is cancelled. Alternatively, in this case, all of the data may be used for compiling a dictionary regardless of lighting categories.

Next, an explanation will be given of operation at face identification referring to FIG. 20

First, when the controlling means 7 determines to shift to a state of face identification (Step S1901/Yes), the lighting environment determining means 501 determines, using information from the imaging means 1 and the robot state observing means 6, the lighting environment before executing face identification to classify the environment into a predetermined lighting category. The resulted category is referred to K (Step S1902). Subsequently, the dictionary selecting means 206 examines whether or not a dictionary of characteristic data when a lighting category is K is stored in the dictionary storing means 205 (Step S1903). If the dictionary is not stored therein (Step S1903/No), the identification is cancelled and the operation goes back to a state of communication with the user. If the dictionary is stored therein (Step S1903/Yes), the dictionary selecting means 206 acquires a dictionary compiled with characteristic data wherein a lighting ID is K from the dictionary storing means 205, and supplies the dictionary to the face identifying means 202 (Step S1904). Subsequently, the imaging means 1 starts to take video, the face detecting means 201 acquires characteristic data of a face from the video, and the face identifying means 202 executes face identification (matching) using the acquired characteristic data and the supplied dictionary to determine who is the user.

As described above, in this embodiment, a face image is registered with respect to each lighting environment, and when executing face identification, the identification is executed using a dictionary compiled using an image registered in the same lighting environment as that in present. Thereby, it is possible to execute identification with high accuracy.

Moreover in this embodiment, the communication with the user and the face identification are described as independent operation, respectively. However, the shooting of a face image may be executed during the communication to execute face identification.

Incidentally, the present invention has been described with reference to the particular preferable embodiments. However, it is to be appreciated that those skilled in the art can change or modify the embodiments without departing from the scope and spirit of the present invention. For example, as conditions used for determining a lighting environment, there may be considered seasons (because the angle of the sunshine slanting into a room, etc. differs between summer and winter, for example) and a weather forecast (used as one of conditions for determining a lighting environment by obtaining weather information of the day through the Internet, etc.).

Furthermore, embodiments of an identifying environment determining program of the present invention can be realized by executing controlling operation by each means on the basis of programs that execute control by following the operation shown in FIGS. 3, 7, 9, 14, 19 and 20, respectively.

As set forth hereinbefore, in the present invention, a lighting environment is determined, and when a lighting environment is not suitable for identification, the identification is not executed. Thereby, it becomes possible to reduce incorrect identification, and therefore, it becomes possible to executed face identification with few mistakes in an environment not suitable for face identification significantly, such as in a house where variations of lighting is large and where it is too dark.

Moreover, when executing identification, a lighting environment is observed and a ratio of correct identification in the same lighting environment in the past as that in the present is examined. Subsequently, in the case of a lighting environment in which number of times of correct identification is few, a robot is moved to another area to change the position and the direction thereof without executing identification. There are diverse variations of the lighting environments and of the conditions in face registration in each different home. Therefore, it is difficult to design the robot as predicting in advance which lighting environment leads to successful identification with high accuracy. Consequently, by learning which place and which lighting environment lead to unsuccessful identification at the stage where a user uses the robot actually, it becomes possible to determine whether or not a lighting environment is suitable for identification with high accuracy compared to a case of predicting in advance lighting conditions difficult to realize successful identification.

Furthermore, identifying performance in the past is retrieved from the identifying performance recording means. Then, there is acquired an identifying performance value in a lighting category wherein states of time, curtains and a lighting device are the same as those in a present. The identifying performance value is calculated by dividing an accumulating total of number of times where face identification has been successful by an accumulating total of number of times where identification has been executed in the lighting category. Subsequently, the robot is moved to a position where the value is, in the present lighting category, equal to or more than itself and is equal to or more than a threshold value, or moved to a position where the value is equal to or more than itself and is the highest. Thereby, it becomes possible to lead a user toward a better lighting environment to reduce incorrect face identification.

Moreover, a lighting state at registration is recorded per user. In the case where there exists, while a user is communicating with the robot, a lighting condition in which the user has not executed a face registration in the past, a registration of the user's face is started or a face registration is recommended to the user. By this means, it becomes possible to register face images under various fighting conditions with high efficiency.

Furthermore, a face image is registered with respect to each lighting state. Subsequently, when executing identification, a lighting state is observed at the time, and identification is executed using a dictionary compiled with an image(s) registered in the same lighting state as that in the present. Thereby, it becomes possible to execute identification with high accuracy compared to a case of executing registration and identification without evaluating a lighting environment.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An identification environment determining method comprising:
   converting a captured image into digital information;
   detecting a face area of a person from the digital information to store the face area, and identifying the person using a stored image and face image information;
   informing a user about a result of said identifying said person;
   inputting information obtained by having the user judge whether the result of identification is correct or incorrect;
   determining whether a present lighting environment is suitable for identification using information obtained in said converting said captured image;
   controlling a robot; and
   moving the robot.

2. The identification environment determining method as claimed in claim 1, wherein whether the lighting environment is suitable is determined using at least one of a variance value of pixel values in the face area a ratio of an average pixel value in the face area to an average pixel value in the vicinity of an outside of the detected face area, and an average pixel value of the whole image.

3. The identification environment determining method as claimed in claim 1, further comprising at least one of:

observing whether a lighting device in a room is turned on;
observing whether curtains in a room are drawn;
retaining information about time; and
retaining positional information obtained by observing a position of the robot in a room,
wherein whether the lighting environment is suitable is determined using at least one of information about whether the lighting device is turned on, information about whether the curtains are drawn, information about time just before executing identification, and the positional information of the robot.

4. The identification environment determining method as claimed in claim 1, wherein:
   when determining to shift to a state for identification whether the present lighting environment is suitable for identification is determined
   when the present lighting environment is suitable for identification, the person is identified; and
   when that the present lighting environment is not suitable for identification, a control is conducted not to identify the person.

5. The identification environment determining method as claimed in claim 1, wherein:
   when determining to shift to a state for identification whether the present lighting environment is suitable for identification is determined
   when that the present lighting environment is suitable for identification, the person is identified;
   when that the present lighting environment is not suitable for identification, a control is conducted not to identify the person; and
   the lighting environment is determined using at least one of a variance value of pixel values in the face area, a ratio of an average pixel value in the face area to an average pixel value in the vicinity of an outside of the detected face area, and an average pixel value of the whole image.

6. The identification environment determining method as claimed in claim 1, further comprising at least one of:
   observing whether a lighting device in a room is turned on;
   observing whether curtains in a room are drawn;
   retaining information about time; and
   retaining positional information obtained by observing a position of the robot in a room, wherein:
      when determining to shift to a state for identification whether the present lighting environment is suitable for identification is determined; and
      when that the present lighting environment is suitable for identification, the person is identified;
      when the present lighting environment is not suitable for identification, a control is conducted not to identify the person; and
      the lighting environment is determined at using at least one of information about whether or the lighting device is turned on, information about whether the curtains are drawn, information about time just before executing identification, and the positional information of the robot.

7. The identification environment determining method as claimed in claim 1, wherein:
   when determining to shift to a state for identification whether the present lighting environment is suitable for identification is determined;

when the present lighting environment is suitable for identification the person is identified; and when that the present lighting environment is not suitable for identification, a control is conducted not to identify the person, and the robot is moved.

8. The identification environment determining method as claimed in claim 1, wherein:

when determining to shift to a state for identification, it is determined whether the present lighting environment is suitable for identification is determined; and when the present lighting environment is suitable for identification, the person is identified; or when the present lighting environment is not suitable for identification, a control is conducted not to identify the person, and the robot is moved; and the lighting environment is determined using at least one of a variance value of pixel values in the face area, a ratio of an average pixel value in the face area to an average pixel value in the vicinity of an outside of the detected face area, and an average pixel value of the whole image.

9. The identification environment determining method as claimed in claim 1, further comprising at least one step selected from:

observing whether a lighting device in a room is turned on;

observing whether or not curtains in a room are drawn;

retaining information about time; and retaining positional information obtained by observing a position of the robot in a room, wherein:

when determining to shift to a state for identification, whether the present lighting environment is suitable for identification is determined;

when the present lighting environment is suitable for identification, the person is identified; and when the present lighting environment is not suitable for identification, a control is conducted not to identify the person, and the robot is moved; and the lighting environment is determined using at least one information selected from information about whether the lighting device is turned on, information about whether or not the curtains are drawn, information about time just before executing identification, and the positional information of the robot.

10. An identification environment determining method comprising:

converting a captured image into digital information;

detecting a face area of a person from the digital information to store the face area, and identifying the person using a stored image and face image information that is referred to for identification;

informing a user about a result of identification;

inputting information obtained by having the user judge whether the result of identification is correct or incorrect;

determining a lighting environment on the basis of the image information acquired in said converting said captured image, and classifying the lighting environment into a corresponding lighting category;

recording, with respect to each lighting category, identifying performance information including a number of times where face identification has succeeded and a number of times where face identification has been executed;

determining whether a present lighting environment is suitable for identification on the basis of the identifying performance information;

controlling a robot; and moving the robot.

11. The identification environment determining method as claimed in claim 10, wherein the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

12. The identification environment determining method as claimed in claim 10, further comprising at least one of:

observing whether a lighting device in a room is turned on;

observing whether or not curtains in a room are drawn;

retaining information about time; and retaining positional information obtained by observing a position of the robot in a room, wherein:

the lighting environment is categorized into the corresponding lighting category using at least one of information about whether the lighting device is turned on, information about whether the curtains are drawn, information about time just before executing identification, and the positional information of the robot.

13. The identification environment determining method as claimed in claim 10, wherein:

the identifying performance information is recorded each time the information whether result of identification is correct is acquired from the user;

when determining to shift to a state for identification, whether the present lighting environment is suitable for identification is determined;

when that the present lighting environment is suitable for identification, the person is identified; and when that the present lighting environment is not suitable for identification, a control is conducted not to identify the person.

14. The identification environment determining method as claimed in claim 10, wherein:

the identifying performance information is recorded each time the information whether a result of identification is correct is acquired from the user;

when determining to shift to a state for identification, whether the present lighting environment is suitable for identification is determined;

when the present lighting environment is suitable for identification, the person is identified;

when the present lighting environment is not suitable for identification, a control is conducted not to identify the person; and the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

15. The identification environment determining method as claimed in claim 10, further comprising at least one of:

observing whether or not a lighting device in a room is turned on;

observing whether or not curtains in a room are drawn;
retaining information about time; and
retaining positional information obtained by observing a position of the robot in a room, wherein:
the identifying performance information is recorded each time the information whether a result of identification is correct is acquired from the user;
when determining to shift to a state for identification, whether the present lighting environment is suitable for identification is determined at; and
when that the present lighting environment is suitable for identification, the person is identified; or
when that the present lighting environment is not suitable for identification, a control is conducted not to identify the person at; and
the lighting environment is categorized into the corresponding lighting category using at least one of information about whether the lighting device is turned on, information about whether the curtains are drawn, information about time just before executing identification, and the positional information of the robot.

16. The identification environment determining method as Claimed in claim 10, wherein:
the identifying performance information is recorded each time the information about whether a result of identification is correct is acquired from the user;
when determining to shift to a state for identification, whether the present lighting environment is suitable for identification is determined; and
when the present lighting environment is suitable for identification, the person is identified; or
when the present lighting environment is not suitable for identification, a control is conducted not to identify the person, and the robot is moved.

17. The identification environment determining method as claimed in claim 10, wherein:
the identifying performance information is recorded each time the information about whether a result of identification is correct is acquired from the user;
when determining to shift to a state for identification, whether the present lighting environment is suitable for identification is determined at;
when the present lighting environment is suitable for identification, the person is identified; and
when the present lighting environment is not suitable for identification, a control is conducted not to identify the person, and the robot is moved; and
the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

18. The identification environment determining method as claimed in claim 10, further comprising at least one of:
observing whether a lighting device in a room is turned on;
observing whether curtains in a room are drawn;
retaining information about time; and
retaining positional information obtained by observing a position of the robot in a room, wherein:
the identifying performance information is recorded each time the information about whether a result of identification is correct is acquired from the user;
when determining to shift to a state for identification, whether the present lighting environment is suitable for identification is determined at;
when that the present lighting environment is suitable for identification, the person is identified; and
when the present lighting environment is not suitable for identification, a control is conducted not to identify the person, and the robot is moved; and
the lighting environment is categorized into the corresponding lighting category using at least one of information about whether the lighting device is turned on, information about whether the curtains are drawn, information about time just before executing identification, and the positional information of the robot.

19. An identification environment determining method comprising:
converting a captured image into digital information;
detecting a face area of a person from the digital information to store the face area, and identifying the person using a stored image and face image information that is referred to for identification;
informing a user about a result of said identifying said person;
inputting information obtained by having the user judge whether the result of identification is correct;
determining a lighting environment on the basis of the image information acquired in said converting said captured image, and classifying the lighting environment into a corresponding lighting category;
recording, with respect to each lighting category, identifying performance information including a number of times where face identification has succeeded and a number of times where face identification has been executed;
determining whether a present lighting environment is suitable for identification on the basis of the identifying performance information;
controlling a robot;
and
moving the robot to a position where identifying performance is higher on the basis of the identifying performance information.

20. The identification environment determining method as claimed in claim 19, wherein the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

21. The identification environment determining method as claimed in claim 19, further comprising at least one of:
a lighting device state observing step for observing whether a lighting device in a room is turned on;
a curtain state observing step for observing whether curtains in a room are drawn;
retaining information about time; and
retaining positional information obtained by observing a position of the robot in a room, wherein:
the lighting environment is categorized into the corresponding lighting category using at least one of information about whether the lighting device is turned on, information about whether the curtains are drawn, information about time just before executing identification, and the positional information of the robot.

22. The identification environment determining method as claimed in claim 19, wherein:
- the identifying performance information is recorded each time the information about whether a result of identification is correct is acquired from the user;
- when determining to shift to a state for identification, whether the present lighting environment is suitable for identification is determined;
- when that the present lighting environment is suitable for identification, the person is identified; and
- when the present lighting environment is not suitable for identification, a control is conducted not to identify the person.

23. The identification environment determining method as claimed in claim 19, wherein:
- the identifying performance information is recorded each time the information about whether a result of identification is correct is acquired from the user;
- when determining to shift to a state for identification, whether the present lighting environment is suitable for identification is determined; and
- when the present lighting environment is suitable for identification, the person is identified; or
- when the present lighting environment is not suitable for identification, a control is conducted not to identify the person; and
- the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

24. The identification environment determining method as claimed in claim 19, further comprising at least one of:
- observing whether a lighting device in a room is turned on;
- observing whether curtains in a room are drawn;
- retaining information about time; and
- retaining positional information obtained by observing a position of the robot in a room, wherein:
  - the identifying performance information is recorded each time the information about whether a result of identification is correct is acquired from the user;
  - when determining to shift to a state for identification, whether the present lighting environment is suitable for identification is determined; and
  - when the present lighting environment is suitable for identification, the person is identified; or
  - when the present lighting environment is not suitable for identification, a control is conducted not to identify the person; and
  - the lighting environment is categorized into the corresponding lighting category using at least one of information about whether the lighting device is turned on, information about whether the curtains are drawn, information about time just before executing identification, and the positional information of the robot.

25. The identification environment determining method as claimed in claim 19, wherein:
- the identifying performance information is recorded each time the information about whether a result of identification is correct or is acquired from the user;
- when determining to shift to a state for identification, whether the present lighting environment is suitable for identification is determined;
- when that the present lighting environment is suitable for identification, the person is identified; and
- when the present lighting environment is not suitable for identification, a control is conducted not to identify the person, and the robot is moved.

26. The identification environment determining method as claimed in claim 19, wherein:
- the identifying performance information is recorded each time the information about whether a result of identification is correct is acquired from the user;
- when determining to shift to a state for identification, whether the present lighting environment is suitable for identification is determined;
- when that the present lighting environment is suitable for identification, the person is identified; and
- when the present lighting environment is not suitable for identification, a control is conducted not to identify the person, and the robot is moved; and
- the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

27. The identification environment determining method as claimed in claim 19, further comprising at least one of:
- observing whether a lighting device in a room is turned on;
- observing whether curtains in a room are drawn;
- retaining information about time; and
- retaining positional information obtained by observing a position of the robot in a room, wherein:
  - the identifying performance information is recorded each time the information about whether a result of identification is correct incorrect is acquired from the user;
  - when determining to shift to a state for identification, whether the present lighting environment is suitable for identification is determined; and
  - when the present lighting environment is suitable for identification, the person is identified; or
  - when the present lighting environment is not suitable for identification, a control is conducted not to identify the person, and the robot is moved; and
  - the lighting environment is categorized into the corresponding lighting category using at least one of information about whether the lighting device is turned on, information about whether the curtains are drawn, information about time just before executing identification, and the positional information of the robot.

28. An identification environment determining method comprising:
- converting a captured image into digital information;
- detecting a face area of a person from the digital image to store the face area, and identifying the person using a stored image and face image information that is referred to for identification;
- informing a user about a result of said identifying said person;
- inputting information obtained by having the user judge whether the result of identification is correct;
- determining a lighting environment on the basis of the image information acquired in said converting said captured image, and classifying the lighting environment into a corresponding lighting category;

recording a lighting environment at registration for registering the captured face image and recording a lighting category for the registered face image with respect to each user;

comparing a lighting environment at registration for determining, on the basis of information recorded in said recording said lighting environment at registration, whether a face image of a user communicating with a robot has been registered in a same lighting environment as a present lighting environment;

controlling the robot; and moving the robot.

29. The identification environment determining method as claimed in claim 28, wherein the lighting environment is categorized into the corresponding lighting category at the lighting environment determining step using at least one of a variance value of pixel values in the face area, a ratio of an average pixel value in the face area to an average pixel value in the vicinity of an outside of the detected face area, and an average pixel value of the whole image.

30. The identification environment determining method as claimed in claim 28, further comprising at least one of:

observing whether a lighting device in a room is turned on;

observing whether curtains in a room are drawn;

retaining information about time; and retaining positional information obtained by observing a position of the robot in a room, wherein:

the lighting environment is categorized into the corresponding lighting category using at least one of information about whether the lighting device is turned on, information about whether the curtains are drawn, information about time just before executing identification, and the positional information of the robot.

31. The identification environment determining method as claimed in claim 28, wherein:

when determining to shift to a state for identification, the person is identified; and when the face image of the user communicating with the robot has not been registered in the lighting environment in said comparing said a lighting environment at registration, an instruction is to register the face image of the user.

32. The identification environment determining method as claimed in claim 28, wherein:

when determining to shift to a state for identification, the person is identified;

the lighting environment is categorized into the corresponding lighting category using at least one of a variance value of pixel values in the face area, a ratio of an average pixel value in the face area to an average pixel value in the vicinity of an outside of the detected face area, and an average pixel value of whole image; and when the face image of the user communicating with the robot has not been registered in the lighting environment, an instruction is issued to register the face image of the user.

33. The identification environment determining method as claimed in claim 28, further comprising at least one of:

observing whether a lighting device in a room is turned on;

observing whether curtains in a room are drawn;

retaining information about time; and retaining positional information obtained by observing a position of the robot in a room, wherein:

when determining to shift to a state for identification, the person is identified;

the lighting environment is categorized into the corresponding lighting category using at least one of information about whether the lighting device is turned on, information about whether the curtains are drawn, information about time just before executing identification, and the positional information of the robot; and when determining that the face image of the user communicating with the robot has not been registered in the lighting environment at the step of comparing a lighting environment at registration, an instruction is issued to register the face image of the user.

34. An identification environment determining method comprising:

converting a captured image into digital information;

detecting a face area of a person from the digital information to store the face area, and identifying the person using a stored image and face image information that is referred to for identification;

informing a user about a result of identification;

inputting information obtained by having the user judge whether the result of identification is correct;

determining a lighting environment on the basis of the image information acquired in said converting said captured image, and classifying the lighting environment into a corresponding lighting category;

detecting and extracting a face area from the image and converting the face area into characteristic data to execute identification;

storing, when acquiring a characteristic data group of a face per person, the characteristic data group in each lighting category;

compiling a recognition dictionary using characteristic data per lighting category;

storing, per lighting category, the recognition dictionary compiled at the dictionary compiling step;

selecting, from recognition dictionaries stored at the dictionary storing step, a recognition dictionary of a same lighting category as the lighting category determined at the lighting environment determining step;

a face identification step for executing identification of characteristic data to determine a user's name on the basis of the recognition dictionary selected at the dictionary selecting step;

controlling a robot; and moving the robot.

35. The identification environment determining method as claimed in claim 34, wherein the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

36. The identification environment determining method as claimed in claim 34, further comprising at least one of:

observing whether a lighting device in a room is turned on;

observing whether curtains in a room are drawn;

retaining information about time; and retaining positional information obtained by observing a position of the robot in a room, wherein:

the lighting environment is categorized into the corresponding lighting category using at least one of information about whether the lighting device is turned on, information about whether the curtains are drawn, information about time just before executing identification, and the positional information of the robot.

37. The identification environment determining method as claimed in claim 34 wherein when determining to shift to a state for identification, the person is identified.

38. The identification environment determining method as claimed in claim 34, wherein:

when determining to shift to a state for identification, the person is identified; and the lighting environment is categorized into the corresponding lighting category using at least one of a variance value of pixel values in the face area, a ratio of an average pixel value in the face area to an average pixel value in the vicinity of an outside of the detected face area, and an average pixel value of the whole image.

39. The identification environment determining method as claimed in claim 34, further comprising at least one of:

observing whether a lighting device in a room is turned on;

observing whether curtains in a room are drawn;

retaining information about time; and retaining positional information obtained by observing a position of the robot in a room, wherein:

when determining to shift to a state for identification, the person is identified; and the lighting environment is categorized into the corresponding lighting category using at least one of information about whether the lighting device is turned on, information about whether the curtains are drawn, information about time just before executing identification, and the positional information of the robot.

40. An identification environment determining method comprising:

receiving images;

identifying a person using said images by recognizing a face of said person;

informing a user about a result of said identifying said person;

inputting information obtained by having the user judge whether the result of identification is correct or incorrect; and determining whether a present lighting environment is suitable for identification using information obtained in said receiving said images.

41. An identification environment determining method comprising:

receiving images;

identifying a person using said images by recognizing its face;

informing a user about a result of identification;

inputting information obtained by having the user judge whether the result of identification is correct or incorrect;

determining a lighting environment on the basis of the image information acquired in said receiving said images, and classifying the lighting environment into a corresponding lighting category;

recording, with respect to each lighting category, identifying performance information including the number of times where face identification has succeeded and the number of times where face identification has been executed; and determining whether a present lighting environment is suitable for identification on the basis of the identifying performance information.

42. An identification environment determining method comprising:

receiving images;

identifying a person using said images by recognizing a face of said person;

informing a user about a result of said identifying said person;

inputting information obtained by having the user judge whether the result of identification is correct;

determining a lighting environment on the basis of the image information acquired in said receiving said images, and classifying the lighting environment into a corresponding lighting category;

recording a lighting environment at registration for registering the captured face image and recording a lighting category for the registered face image with respect to each user; and comparing a lighting environment at registration for determining, on the basis of information recorded in said at said recording said lighting environment at registration, whether a face image of a user communicating with a robot has been registered in a same lighting environment as a present lighting environment.

43. An identification environment determining method comprising:

receiving images;

identifying a person using said images by recognizing a face of said person;

informing a user about a result of identification;

inputting information obtained by having the user judge whether the result of identification is correct;

determining a lighting environment on the basis of the image information acquired in said receiving said images, and classifying the lighting environment into a corresponding lighting category;

detecting and extracting a face area from the image acquired at said receiving said images, and converting the face area into characteristic data to execute identification;

storing, when acquiring a characteristic data group of a face per person, the characteristic data group in each lighting category;

compiling a recognition dictionary using characteristic data per lighting category; and storing, per lighting category, the recognition dictionary compiled in said compiling said recognition dictionary;

selecting, from recognition dictionaries stored at the dictionary storing step, a recognition dictionary of a same lighting category as the lighting category determined in said determining said lighting environment; and executing identification of characteristic data to determine a user name on the basis of the recognition dictionary selected in said selecting said recognition dictionary.

44. An identification environment determining method comprising:

receiving images;

identifying a person using said images by recognizing a face of said person;

informing a user about a result of said identifying said person;

inputting information obtained by having the user judge whether the result of identification is correct;

determining a lighting environment on the basis of the image information acquired in said receiving said images, and classifying the lighting environment into a corresponding lighting category;

recording, with respect to each lighting category, identifying performance information including the number of times where face identification has succeeded and the number of times where face identification has been executed;

determining whether a present lighting environment is suitable for identification on the basis of the identifying performance information;

controlling a robot; and moving the robot to a position where identifying performance is higher on the basis of the identifying performance information.

\* \* \* \* \*